United States Patent
Sugasaki

(10) Patent No.: US 7,582,410 B2
(45) Date of Patent: Sep. 1, 2009

(54) LASER-DECOMPOSABLE RESIN COMPOSITION AND PATTERN-FORMING MATERIAL USING THE SAME

(75) Inventor: Atsushi Sugasaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/829,381

(22) Filed: Jul. 27, 2007

(65) Prior Publication Data

US 2008/0038663 A1      Feb. 14, 2008

(30) Foreign Application Priority Data

Aug. 11, 2006  (JP)  .............................. 2006-219561
Jan. 31, 2007  (JP)  .............................. 2007-021100

(51) Int. Cl.
  G03F 7/039  (2006.01)
  G03F 7/032  (2006.01)
  G03F 7/09   (2006.01)
  G03C 1/73   (2006.01)
  G03C 1/76   (2006.01)

(52) U.S. Cl. .................... 430/271.1; 430/306; 430/300; 430/302; 430/307; 430/281.1; 430/283.1; 430/285.1

(58) Field of Classification Search ........................ None
See application file for complete search history.

(56) References Cited

U.S. PATENT DOCUMENTS

| 4,081,572    | A  |   | 3/1978  | Pacansky            |
|--------------|----|---|---------|---------------------|
| 6,117,610    | A  | * | 9/2000  | Sheriff et al. ............... 430/190 |
| 6,309,792    | B1 |   | 10/2001 | Hauck et al.        |
| 6,420,083    | B1 |   | 7/2002  | Kawamura            |
| 2002/0098439 | A1 |   | 7/2002  | Kubo et al.         |
| 2005/0106495 | A1 |   | 5/2005  | Fujimaki            |

FOREIGN PATENT DOCUMENTS

| JP | 8258442    | A  | 10/1996 |
|----|------------|----|---------|
| JP | 10119436   | A  | 5/1998  |
| JP | 10244751   | A  | 9/1998  |
| JP | 2000122272 | A  | 4/2000  |
| JP | 2002537419 | A  | 11/2002 |
| JP | 2004310000 | A  | 11/2004 |
| WO | 0048836    | A1 | 8/2000  |

OTHER PUBLICATIONS

European Search Report Dated Nov. 21, 2007.

* cited by examiner

*Primary Examiner*—Sin J. Lee
(74) *Attorney, Agent, or Firm*—Sughrue Mion, PLLC

(57) ABSTRACT

A laser-decomposable resin composition contains: a compound including at least one structure selected from a carboxyl group and a carboxylic acid anhydride structure and at least one hetero atom selected from N, S and O atoms other than the structure; and a binder polymer.

7 Claims, No Drawings

LASER-DECOMPOSABLE RESIN COMPOSITION AND PATTERN-FORMING MATERIAL USING THE SAME

FIELD OF THE INVENTION

The present invention relates to a laser-decomposable resin composition, more particularly to a laser-decomposable resin composition having a high decomposability to a laser treatment and a pattern-forming material using the same.

BACKGROUND OF THE INVENTION

Decomposable resins and decomposable resin compositions means resins decomposable in response to an external factor, for example, a thermal factor, a mechanical factor, a photochemical factor, a radiation-chemical factor or a factor with a chemical agent and are well known. Change in the form (liquefaction or vaporization) or change in the nature or property, for example, molecular weight, hardness, viscoelasticity, glass transition point (Tg), solubility or adhesiveness of the resin or resin composition before and after the decomposition, which is caused by the decomposition of resin, is utilized in various fields.

Examples of the decomposable resin and decomposable resin composition include a biodegradable plastic (for example, polylactic acid) for decreasing environmental impact of plastic material and a slow releasing material which can gradually release a component, for example, medical agent or fragrance in the field of healthcare, cosmetic or life science. However, they gradually decompose by oxygen, light or enzyme in a natural environment, within the living body, in the soil or the like and thus they do not stably maintain their initial states and can not induce at once a large change in the nature upon the external stimulation.

Resins which are decomposed by light or heat for improvement in the recycling efficiency or simplification of the disposal and adhesives which decrease the adhesiveness thereof are also developed. Further, it is known that ceramic or carbon fiber is mixed with a decomposable resin and then the decomposable resin is removed, for example, by calcination to form a porous material. However, in these cases, the materials are altogether treated or processed and it is not intended to form the desired pattern only in the desired portion. Also, large energy is required for the decomposition treatment.

With respect to the application to image formation, for instance, it is known that both preservation stability and image fixability of toner are achieved by utilizing change in the nature due to heat at the heat-fixing of the toner containing a heat-decomposable resin. However, the resin per se does not have sufficient response to the pattern-wise stimulation.

As for pattern-forming materials, on the other hand, for example, a so-called chemically-amplified resist is well known as a photoresist. Specifically, a composition containing an acid generator and an acid-decomposable resin is pattern-wise exposed followed by heat treatment, if desired, to decompose pattern-wise the resin and the pattern is formed with development processing. Although the composition satisfies both the preservation stability and the pattern-forming property at a practical level, the development process in which the processing conditions are fully controlled is indispensable for the formation of pattern. Further, the pattern-formation in a thick layer having, for example, several tens of micrometers or more is difficult, though it is possible to apply to a thin layer.

A method of forming an image utilizing a step of removing (ablation) a part of thin layer by imagewise irradiation of laser beam is also known (JP-A-10-119436 (the term "JP-A" as used herein means an "unexamined published Japanese patent application")). However, the compounds recited as the heat-decomposable resin are only conventional general-purpose resins, for example, polyesters, polycarbonates or polyurethanes, and the thickness of the layer is only around 1 to 2 µm. It is also known to use a compound defined its heat decomposability (JP-A-10-244751 (corresponding to US 2002/098439 A1)). However, the thickness of the layer described therein is also only around 1 to 2 µm.

As a mask material for paste printing to a printed circuit board or the like, a mask for forming a pattern having approximately 100 to 200 µm utilizing a photo-decomposable resin sheet and a production method of the mask are described (JP-A-8-258442). However, a specific compound does not disclosed in the patent. Also, the controlled development processing is indispensable in order to form the pattern while regulating the degree of exposure and development.

On the other hand, in order to form a pattern in a thick layer by a simple process, for example, pattern-formation by laser processing is known, in which the base material per se is removed, deformed or discolored by imagewise irradiation of laser beam. For instance, a method of recording information, for example, a lot number on a product (for example, video tape or home electric appliances) composed of a variety of base materials is utilized as a laser maker. In such cases, conventional resins are used as they are as the base material.

In the pattern-formation by laser processing, it is desired that a laser engraving portion (concave portion) be rapidly formed. For this purpose, a high-sensitive laser-decomposable pattern-forming material is needed.

In particular, in case of a flexographic printing plate precursor of a direct drawing type by laser (so-called flexographic printing plate precursor for laser engraving), since ease of engraving by laser beam (engraving sensitivity) dominates plate-making speed, a flexographic printing plate precursor for laser engraving using a high-sensitive laser-decomposable resin composition has been required.

On the other hand, a means for improving curing sensitivity of a polymerizable composition by using a compound which undergoes decarboxylation due to heat is described (JP-A-2004-310000 (corresponding to US 2005/0106495 A1), JP-A-2002-537419 (corresponding to WO 00/48836) and JP-A-2000-122272). The polymerizable composition described in JP-A-2004-310000 (corresponding to US 2005/0106495 A1), JP-A-2002-537419 (corresponding to WO 00/48836) and JP-A-2000-122272 is a negative type polymerizable composition capable of forming an image area by curing (polymerizing) in the laser exposed area.

Further, in U.S. Pat. No. 4,081,572, a method of forming an image by dehydration ring-closing of a polymer including carboxylic acid with heat or laser is described. This technique is also an example of a so-called polarity conversion negative type printing plate wherein a hydrophilic layer is converted to a hydrophobic layer by exposure.

On the contrary, a report has not yet been found that in a composition which is not cured but is decomposed by laser exposure, the compound which undergoes decarboxylation due to heat can increase a heat decomposability of the composition, as the present invention described hereinafter.

SUMMARY OF THE INVENTION

An object of the present invention is to provide a laser-decomposable resin composition which is applicable to a thick layer, has high engraving sensitivity and is capable of being efficiently engraved with low laser energy, and a pattern-forming material using the composition.

As a result of the extensive investigations, the inventor has found that by adding the compound which undergoes decarboxylation due to heat to a composition containing a binder polymer, the binder polymer which is ordinarily not decomposed easily with heating or laser exposure can be easily decomposed and by utilizing this feature, a pattern formation with laser exposure can be easily performed in comparison with a heretofore known method.

Specifically, the above-described object can be achieved by the following constitution.

(1) A laser-decomposable resin composition comprising (A) a compound including at least one structure selected from a carboxyl group and a carboxylic acid anhydride structure and at least one hetero atom selected from N, S and O atoms other than the structure in its molecule (in a moiety of the compound other than the moiety of the structure) and (B) a binder polymer.

(2) The laser-decomposable resin composition as described in (1) above, wherein the structure selected from a carboxyl group and a carboxylic acid anhydride structure is connected to the hetero atom through a methylene group which may be substituted.

(3) The laser-decomposable resin composition as described in (1) above, wherein the compound (A) has at least one group represented by the following formula (I):

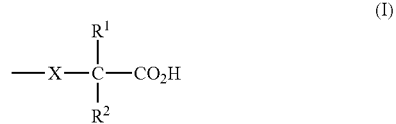
(I)

In formula (I), X represents a divalent connecting group selected from —O—, —S—, —SO$_2$—, —NH—, —N(R$^3$)— and —CO—, R$^3$ represents a hydrogen atom or a monovalent substituent, R$^1$ and R$^2$ each independently represents a hydrogen atom or a monovalent substituent, or R$^1$ and R$^2$ or any one of R$^1$ and R$^2$ and R$^3$ may be combined with each other to form a ring structure.

(4) The laser-decomposable resin composition as described in (1) above, wherein the compound (A) is a compound represented by the following formula (I-2):

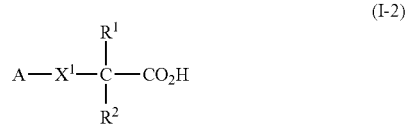
(I-2)

In formula (I-2), A represents an aromatic group or a heterocyclic group, X$^1$ represents a divalent connecting group selected from —O—, —S—, —SO$_2$—, —NH—, —N(R$^3$)— and —CO—, R$^3$ represents a hydrogen atom or a monovalent substituent, R$^1$ and R$^2$ each independently represents a hydrogen atom or a monovalent substituent, or R$^1$ and R$^2$, any one of R$^1$ and R$^2$ and X$^1$, any one of R$^1$ and R$^2$ and A or A and X$^1$ may be combined with each other to form a ring structure.

(5) The laser-decomposable resin composition as described in (1) above, wherein the compound (A) is at least one compound selected from compounds represented by the following formulae (PC-1) and (PC-2):

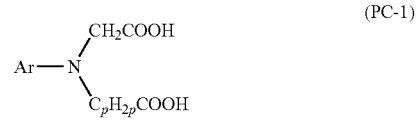
(PC-1)

In formula (PC-1), Ar represents a mono-, poly- or unsubstituted aryl group, and p represents an integer of 1 to 5;

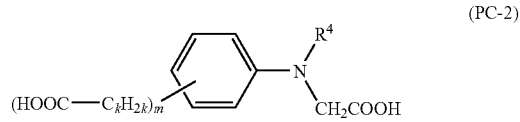
(PC-2)

In formula (PC-2), R$^4$ represents a hydrogen atom or an alkyl group having from 1 to 6 carbon atoms, and k and m each represents an integer of 1 to 5.

(6) The laser-decomposable resin composition as described in any one of (1) to (5) above which further comprises (C) a polymerizable compound.

(7) A laser-decomposable resin composition prepared by curing the laser-decomposable resin composition as described in any one of (1) to (6) above.

(8) A pattern-forming material comprising a support having thereon a layer comprising a laser-decomposable resin composition comprising (A) a compound including at least one structure selected from a carboxyl group and a carboxylic acid anhydride structure and at least one hetero atom selected from N, S and O atoms other than the structure in its molecule and (B) a binder polymer.

(9) The pattern-forming material as described in (8) above, wherein the laser-decomposable resin composition further comprises (C) a polymerizable compound.

(10) A pattern-forming material comprising a support having thereon a layer prepared by curing the laser-decomposable resin composition as described in (9) above.

(11) The pattern-forming material as described in (9) or (10) above which is a flexographic printing plate precursor for laser engraving.

The pattern-forming material characterized by having a layer comprising the laser-decomposable resin composition according to the invention means a pattern-forming material in general in which the laser-exposed area forms a concave portion of the concavo-convex pattern. Although the concave portion may be formed by conducting heating treatment or development processing with an aqueous alkali solution or the like after the laser exposure, the pattern-forming material according to the invention is particularly preferably employed in the case of forming the concave portion directly (by ablation) with the laser exposure.

The functional mechanism according to the invention is not quite clear but is presumed as follows.

The compound (A) generates carbon dioxide gas by thermal decomposition of the carboxyl group or carboxylic acid anhydride structure thereof at the heating or laser exposure (resulting in instantaneous ultrahigh temperature state). Since the carbon dioxide gas is generated from the inside of composition, it is presumed that the compound (A) assists thermal decomposition of the coexisting binder polymer (B) and as a result, the laser decomposability increases in comparison with the case where the compound (A) is not contained.

Further, a film property can be controlled by using together with the polymerizable compound (C) according to a preferable embodiment of the invention. Specifically, for example, brittleness or flexibility can be controlled by the amount of the polymerizable compound used.

Moreover, it is preferred that the composition according to the invention is changed to a previously crosslinked (polymerized) composition before undergoing the laser decomposition from the standpoint of increasing the strength of layer.

According to the present invention, a laser-decomposable resin composition which is applicable to a thick layer, has high engraving sensitivity and is capable of being efficiently engraved with low laser energy, and a pattern-forming material using the composition can be provided.

DETAILED DESCRIPTION OF THE INVENTION

The laser-decomposable resin composition according to the invention comprises as the compound which undergoes decarboxylation due to heat, (A) a compound including at least one structure selected from a carboxyl group and a carboxylic acid anhydride structure and at least one hetero atom selected from N, S and O atoms other than the structure in its molecule and (B) a binder polymer.

Each of the components contained in the laser-decomposable resin composition will be described in greater detail below.

(A) Compound Including at Least One Structure Selected from a Carboxyl Group and a Carboxylic Acid Anhydride Structure and at Least One Hetero Atom Selected from N, S and O Atoms Other than the Structure in its Molecule The compound (A) is preferably includes at least one structure selected from a carboxyl group and a carboxylic acid anhydride structure which undergoes decarboxylation due to heat, preferably under temperature condition of 100 to 300° C. Specifically, any compound including at least one functional group which is decomposed with heat to undergo decarboxylation can be used in the composition according to the invention.

Among them, a compound wherein at least one structure selected from a carboxyl group and a carboxylic acid anhydride structure is connected to the above-described hetero atom through a methylene group which may be substituted is preferable. The substituent for the methylene group will be described in detail in the description relating to the compound represented by formula (I-2) which is a more preferable embodiment.

More preferably, a compound including a structure capable of forming a 4-membered to 6-membered lactone ring, a 4-membered to 6-membered lactone ring or a 4-membered to 6-membered cyclic acid anhydride by decarboxylation or dehydration reaction at temperature of 100 to 300° C. is exemplified.

A specific preferable example of the compound (A) includes a compound having at least one group represented by the following formula (I):

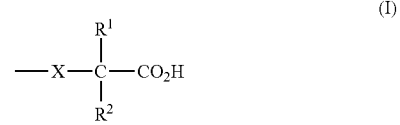

In formula (I), X represents a divalent connecting group selected from —O—, —S—, —SO$_2$—, —NH—, —N(R$^3$)— and —CO—, R$^3$ represents a hydrogen atom or a monovalent substituent, R$^1$ and R$^2$ each independently represents a hydrogen atom or a monovalent substituent, or R$^1$ and R$^2$ or any one of R$^1$ and R$^2$ and R$^3$ may be combined with each other to form a ring structure. The monovalent substituent will be described in detail in the description relating to the compound represented by formula (I-2) which is a more preferable embodiment.

The compound (A) is preferably has a molecular weight from 100 to 8,000, more preferably from 120 to 6,000, and still more preferably from 140 to 2,000.

Specific examples (1) to (72) of the compound having at least one group represented by formula (I) described above which can be preferably used as the compound (A) in the invention are set forth below, but the invention should not be construed as being limited thereto.

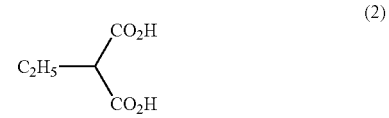

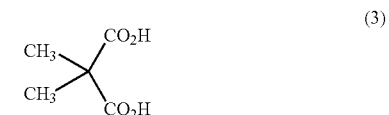

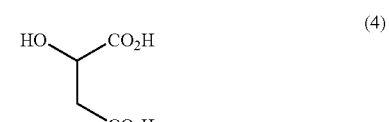

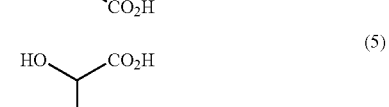

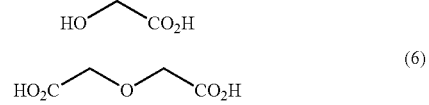

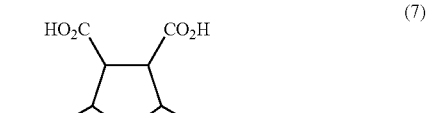

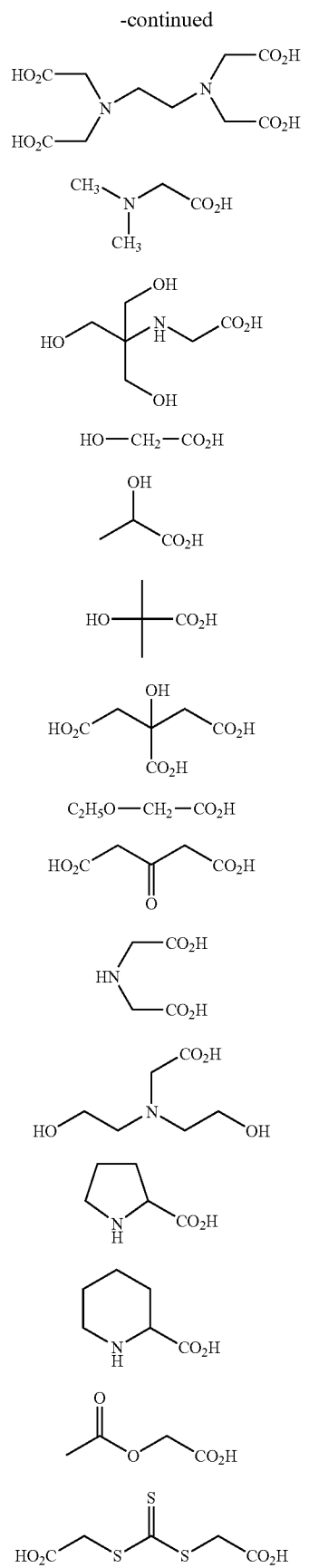
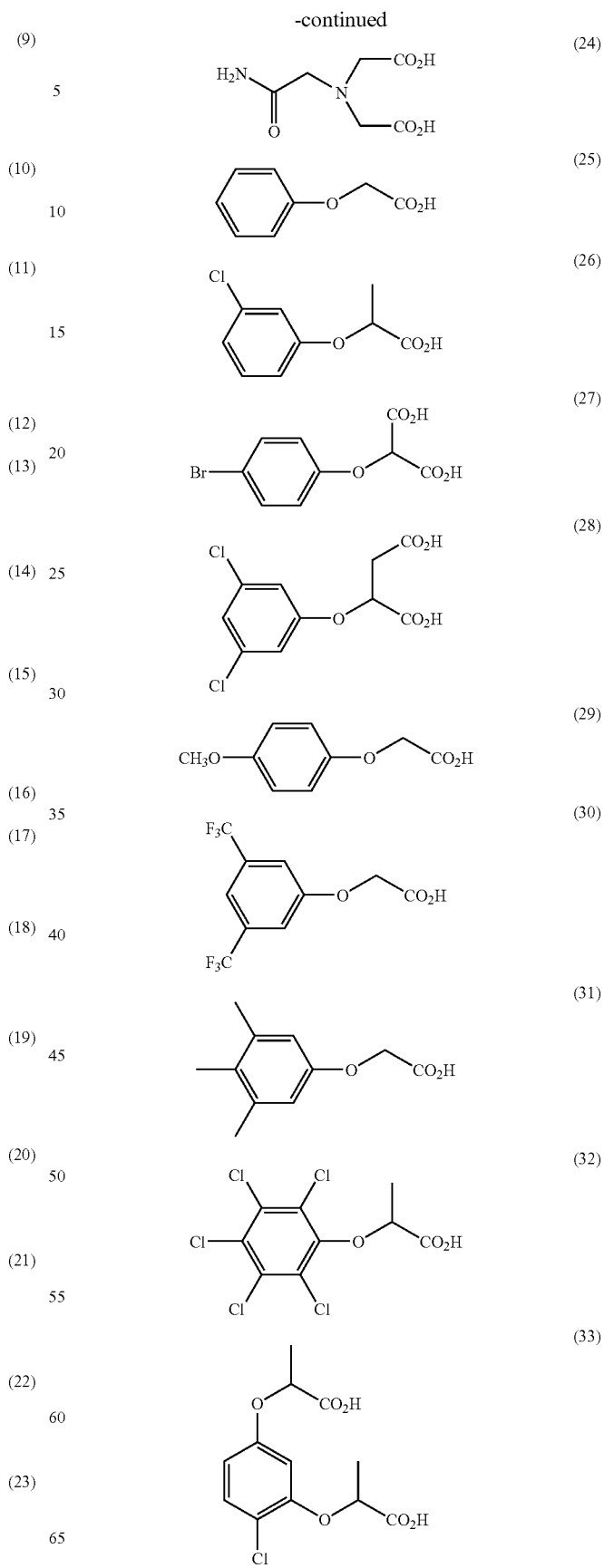

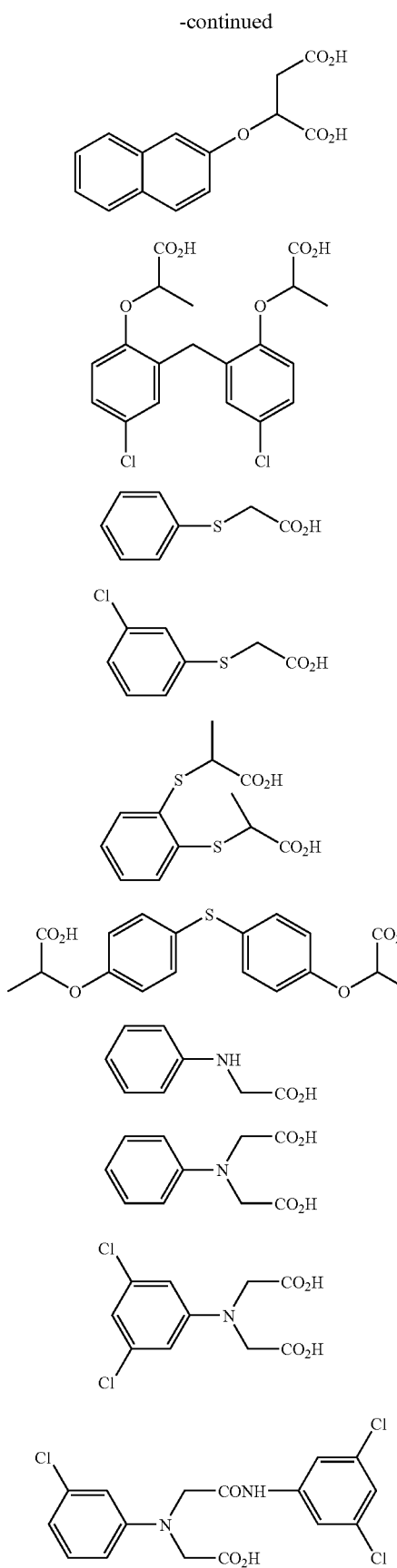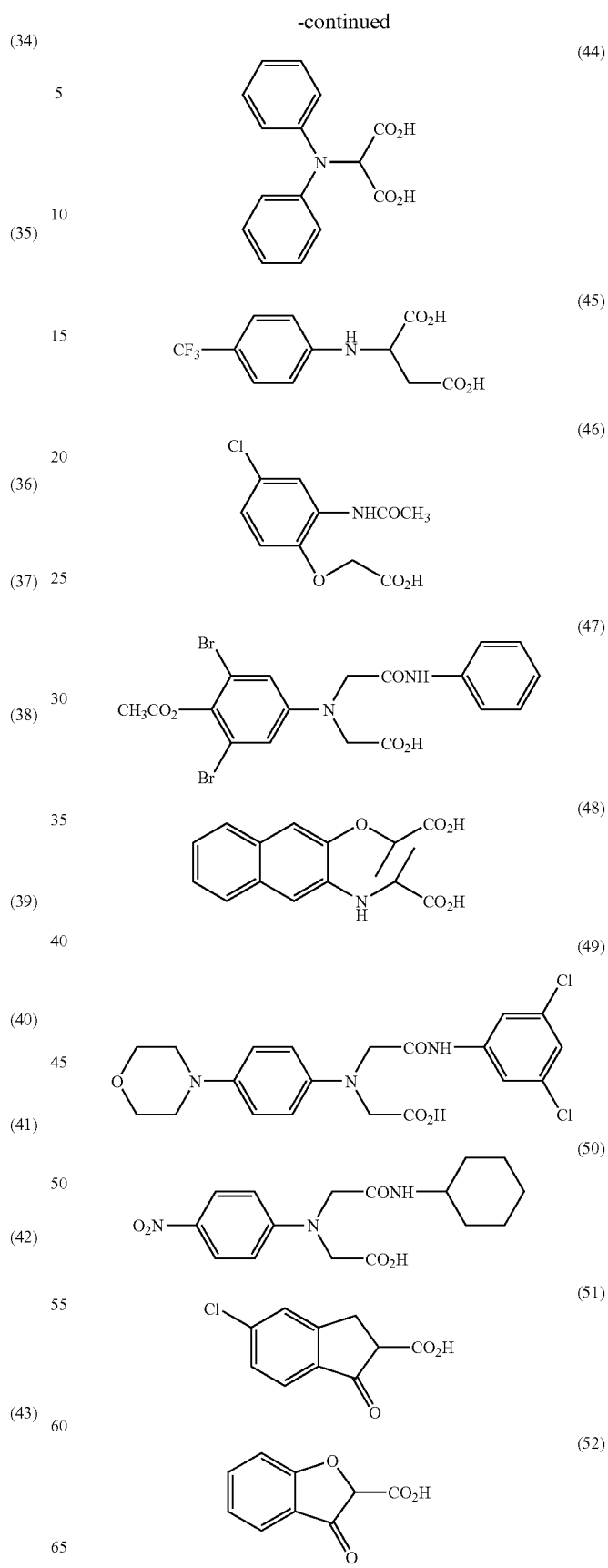

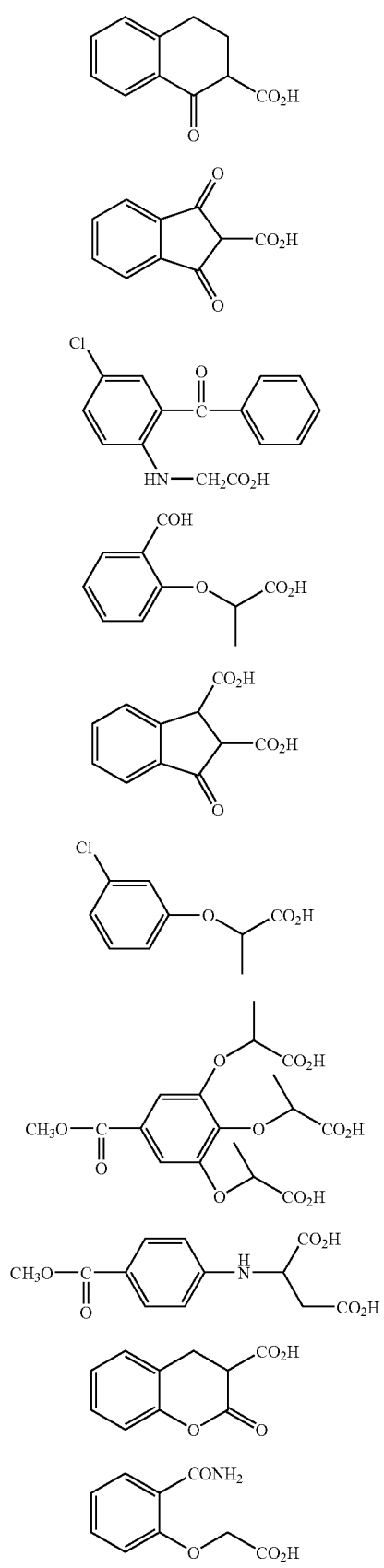
A representative synthesis example of the compound (A) according to the invention is described below, but the invention should not be construed as being limited thereto.

<Synthesis of Compound (46)>

Into a 200-ml round-bottom flask were put 9.9 g of methyl 3-hydroxybenzoate and 8.4 g of methyl 2-chloropropionate and to the mixture was added 65 ml of N,N-dimethylacetamide. To the mixture were added 5.8 g of potassium carbonate and 2.8 g of potassium iodide and the mixture was heated to 100° C. After being reacted for 10 hours, the reaction solution was poured into 300 ml of water and extracted with 300 ml of ethyl acetate. The organic solvent was distilled off under a reduced pressure to obtain 14.5 g of the residue. Into a 100-ml round-bottom flask were put 7.2 g of the residue, 8 ml of water and 8 ml of methanol and the mixture was cooled to 0° C. To the mixture was added 2.4 g of sodium hydroxide and the mixture was stirred at room temperature for 12 hours. The reaction solution was poured into 200 ml of water and controlled the pH thereof to 2. The resulting deposit was adjusted by filtration to obtain 5.0 g of Compound (46). It was confirmed that the product was Compound (46) by an NMR spectrum, an IR spectrum and a mass spectrum.

(Mono-Carboxylic Acid Compound)

As a preferable embodiment of the compound (A), a mono-carboxylic acid compound represented by formula (I-2) shown below is also exemplified.

The mono-carboxylic acid compound is preferably used in the case where the binder polymer (B) used is a relatively hydrophobic binder polymer from the stand point of compatibility.

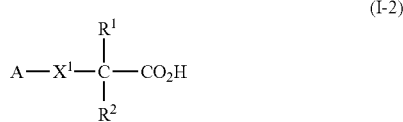

(I-2)

In formula (I-2), A represents an aromatic group or a heterocyclic group. $R^1$ and $R^2$ each independently represents a hydrogen atom or a monovalent substituent. $R^1$ and $R^2$ have the same meanings as $R^1$ and $R^2$ defined in the compound having at least one group represented by formula (I) described above, respectively. Alternatively, $R^1$ and $R^2$, any one of $R^1$ and $R^2$ and $X^1$, any one of $R^1$ and $R^2$ and A or A and $X^1$ may be combined with each other to form a ring structure.

$X^1$ represents a divalent connecting group selected from —O—, —S—, —SO$_2$—, —NH—, —N($R^3$)— and —CO—, and $R^3$ represents a hydrogen atom or a monovalent substituent.

The aromatic group represented by A in formula (I-2) includes, for example, a benzene ring group, a condensed ring group composed of two or three benzene rings and a condensed ring group composed of a benzene ring and a 5-membered unsaturated ring. Specific examples of the aromatic group include a phenyl group, a naphthyl group, an anthryl group, a phenanthryl group, an indenyl group, an acenaphthenyl group and a fluorenyl group. Among them, a phenyl group and a naphthyl group are preferable.

The aromatic group may have a substituent and examples of the aromatic group having a substituent include the hereinafter described aryl groups having a group constituting from a monovalent non-metallic atomic group (exclusive of a hydrogen atom), as a substituent, on the ring-forming carbon atom thereof. Preferable examples of the substituent capable of being introduced include the hereinafter described alkyl group, substituted alkyl group and the substituents for the substituted alkyl group.

The heterocyclic group represented by A includes, for example, a pyrrole ring group, a furan ring group, a thiophene ring group, a benzopyrrole ring group, a benzofuran ring group, a benzothiophene ring group, a pyrazole ring group, an isoxazole ring group, an isothiazole ring group, an indazole ring, a benzisoxazole ring group, a benzisothiazole ring group, an imidazole group, an oxazole ring group, a thiazole ring group, a benzimidazole group, a benzoxazole ring group, a benzothiazole ring group, a pyridine ring group, a quinoline ring group, an isoquinoline ring group, a pyridazine ring group, a pyrimidine ring group, a pyrazine ring group, a phthalazine ring group, a quinazoline ring group, a quinoxaline ring group, an aciridine ring group, a phenanthrydine ring group, a carbazole ring group, a purine ring group, a pyrane ring group, a piperidine ring group, a piperazine ring group, a morpholine ring group, an indole ring group, an indolizine ring group, a chromene ring group, a cinnnoline ring group, an acridine ring group, a phenothiazine ring group, a tetrazole ring group and a triazine ring group.

The heterocyclic group may have a substituent and examples of the substituent include a group constituting from a monovalent non-metallic atomic group (exclusive of a hydrogen atom), positioned as a substituent, on the ring-forming carbon atom of the hereinafter described aryl group. Preferable examples of the substituent include the hereinafter described alkyl group, substituted alkyl group and the substituents for the substituted alkyl group.

The alkyl group includes a straight-chain, branched or cyclic alkyl group having from 1 to 20 carbon atoms. Specific examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-ethylhexyl group, a 2-methylhexyl group, a cyclohexyl group, a cyclopentyl group and a 2-norbornyl group. Of the alkyl groups, a straight-chain alkyl group having from 1 to 12 carbon atoms, a branched alkyl group having from 3 to 12 carbon atoms and a cyclic alkyl group having from 5 to 12 carbon atoms are preferred.

As the substituent capable of being introduced into the alkyl group, a group constituting from a monovalent non-metallic atomic group (exclusive of a hydrogen atom) is used. Preferable examples of the substituent for the alkyl group include a halogen atom (e.g., —F, —Br, —Cl or —I), a hydroxy group, an alkoxy group, an aryloxy group, a mercapto group, an alkylthio group, an arylthio group, an alkyldithio group, an aryldithio group, an amino group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, a ureido group, an N'-alkylureido group, an N',N'-dialkylureido group, N'-arylureido group, an N',N'-diarylureido group, an N'-alkyl-N'-arylureido group, an N-alkylureido group, N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—$SO_3H$) and a conjugate base group thereof (hereinafter, referred to as a sulfonato group), an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, a phosphono group (—$PO_3H_2$) and a conjugate base group thereof (hereinafter, referred to as a phosphonato group), a dialkylphosphono group (—$PO_3(alkyl)_2$, wherein "alkyl" means an alkyl group, hereinafter the same), a diarylphosphono group (—$PO_3(aryl)_2$, wherein "aryl" means an aryl group, hereinafter the same), an alkylarylphosphono group (—$PO_3(alkyl)(aryl)$), a monoalkylphosphono group (—$PO_3H(alkyl)$) and a conjugate base group thereof (hereinafter, referred to as an alkylphosphonato group), a monoarylphosphono group (—$PO_3H(aryl)$) and a conjugate base group thereof (hereinafter, referred to as an arylphosphonato group), a phosphonoxy group (—$OPO_3H_2$) and a conjugate base group thereof (hereinafter, referred to as a phosphonatoxy group), a dialkylphosphonoxy group (—$OPO_3(alkyl)_2$), a diarylphosphonoxy group (—$OPO_3(aryl)_2$), an alkylarylphosphonoxy group (—$OPO_3(alkyl)(aryl)$), a monoalkylphosphonoxy group (—$OPO_3H(alkyl)$) and a conjugate base group thereof (hereinafter, referred to as an alkylphosphonatoxy group), a monoarylphosphonoxy group (—$OPO_3H(aryl)$) and a conjugate base group thereof (hereinafter, referred to as an arylphosphonatoxy group), a cyano group, a nitro group, an aryl group, an alkenyl group, an alkynyl group, a heterocyclic group and a silyl group.

Specific examples of the alkyl group included in the above-described substituent include those described for the alkyl group above. Specific examples of the aryl group included in the above-described substituent include a phenyl group, a biphenyl group, a naphthyl group, a tolyl group, a xylyl group, a mesityl group, a cumenyl group, a chlorophenyl group, a bromophenyl group, a chloromethylphenyl group, a hydroxyphenyl group, a methoxyphenyl group, an ethoxyphenyl group, a phenoxyphenyl group, an acetoxyphenyl group, a benzoyloxyphenyl group, a methylthiophenyl group, a phenylthiophenyl group, a methylaminophenyl group, a dimethylaminophenyl group, an acetylaminophenyl group, a carboxyphenyl group, a methoxycarbonylphenyl group, an ethoxycarbonylphenyl group, a phenoxycarbonylphenyl group, an N-phenylcarbamoylphenyl group, a cyanophenyl group, a sulfophenyl group, a sulfonatophenyl group, a phosphonophenyl group and a phosphonatophenyl group.

Specific examples of the alkenyl group include a vinyl group, a 1-propenyl group, a 1-butenyl group, a cinnamyl group and a 2-chloro-1-ethenyl group. Specific examples of the alkynyl group include an ethynyl group, a 1-propynyl group, a 1-butynyl group and a trimethylsilylethynyl group.

As $R^{01}$ in the acyl group ($R^{01}CO$—), a hydrogen atom and the above-described alkyl group and aryl group are exemplified.

Of the substituents, a halogen atom (for example, —F, —Br, —Cl or —I), an alkoxy group, an aryloxy group, an alkylthio group, an arylthio group, an N-alkylamino group, an N,N-dialkylamino group, an acyloxy group, an N-alkylcarbamoyloxy group, an N-arylcarbamoyloxy group, an acylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N-alkyl-N-arylcarbamoyl group, a sulfo group, a sulfonato group, a sulfamoyl group, an N-alkylsulfamoyl group, an N,N-dialkylsulfamoyl group, an N-arylsulfamoyl group, an N-alkyl-N-arylsulfamoyl group, a phosphono group, a phosphonato group, a dialkylphosphono group, a diarylphosphono group, a monoalkylphosphono group, an alkylphosphonato group, a monoarylphosphono group, an arylphosphonato group, a phosphonooxy group, a phosphonatooxy group, an aryl group and an alkenyl group are more preferable.

Examples of the heterocyclic group include a pyridyl group and a piperizinyl group. Examples of the silyl group include a trimethylsilyl group.

On the other hand, as an alkylene group in the substituted alkyl group, a divalent organic residue resulting from elimination of any one of hydrogen atoms on the above-described alkyl group having from 1 to 20 carbon atoms can be enumerated. Examples of preferable alkylene group include a straight chain alkylene group having from 1 to 12 carbon atoms, a branched alkylene group having from 3 to 12 carbon atoms and a cyclic alkylene group having from 5 to 10 carbon atoms.

Specific preferable examples of the substituted alkyl group which is obtained by combining the above-described substituent with the alkylene group include a chloromethyl group, a bromomethyl group, a 2-chloroethyl group, a trifluoromethyl group, a methoxymethyl group, an isopropoxymethyl group, a butoxymethyl group, a sec-butoxybutyl group, a methoxyethoxyethyl group, an allyloxymethyl group, a phenoxymethyl group, a methylthiomethyl group, a tolylthiomethyl group, a pyridylmethyl group, a tetramethylpiperidinylmethyl group, an N-acetyltetramethylpiperidinylmethyl group, a trimethylsilylmethyl group, a methoxyethyl group, an ethylaminoethyl group, a diethylaminopropyl group, a morpholinopropyl group, an acetyloxymethyl group, a benzoyloxymethyl group, an N-cyclohexylcarbamoyloxyethyl group, an N-phenylcarbamoyloxyethyl group, an acetylaminoethyl group, an N-methylbenzoylaminopropyl group, a 2-oxoethyl group, a 2-oxopropyl group, a carboxypropyl group, a methoxycarbonylethyl group, an allyloxycarbonylbutyl group, a chlorophenoxycarbonylmethyl group, a carbamoylmethyl group, an N-methylcarbamoylethyl group, an N,N-dipropylcarbamoylmethyl group, an N-(methoxyphenyl)carbamoylethyl group, an N-methyl-N-(sulfophenyl)carbamoylmethyl group, a sulfobutyl group, a sulfonatobutyl group, a sulfamoylbutyl group, an N-ethylsulfamoylmethyl group, an N,N-dipropyl-sulfamoylpropyl group, an N-tolylsulfamoylpropyl group, an N-methyl-N-(phosphonophenyl) sulfamoyloctyl group, a phosphonobutyl group, a phosphonatohexyl group, a diethylphosphonobutyl group, a diphenylphosphonopropyl group, a methylphosphonobutyl group, a methylphosphonatobutyl group, a tolylphosphonohexyl group, a tolylphosphonatohexyl group, a phosphonooxypropyl group, a phosphonatooxybutyl group, a benzyl group, a phenethyl group, an α-methylbenzyl group, a 1-methyl-1-phenylethyl group, a p-methylbenzyl group, a cinnamyl group, an allyl group, a 1-propenylmethyl group, a 2-butenyl group, a 2-methylallyl group, a 2-methylpropenylmethyl group, a 2-propynyl group, a 2-butynyl group and a 3-butynyl group.

The aryl group includes a benzene ring group, a condensed ring group composed of two or three benzene rings and a condensed ring group composed of a benzene ring and a 5-membered unsaturated ring. Specific examples of the aryl group include a phenyl group, a naphthyl group, an anthryl group, a phenanthryl group, an indenyl group, an acenaphthenyl group and a fluorenyl group. Among them, a phenyl group and a naphthyl group are preferable.

As a substituted aryl group, an aryl group having a group constituting from a monovalent non-metallic atomic group (exclusive of a hydrogen atom), as a substituent, on the ring-forming carbon atom of the above-described aryl group is exemplified. Preferable examples of the substituent include the above-described alkyl group and substituted alkyl group and the substituents for the substituted alkyl group.

Specific preferable examples of the substituted aryl group include a biphenyl group, a tolyl group, a xylyl group, a mesityl group, a cumenyl group, a chlorophenyl group, a bromophenyl group, a fluorophenyl group, a chloromethylphenyl group, a trifluoromethylphenyl group, a hydroxyphenyl group, a methoxyphenyl group, a methoxyethoxyphenyl group, an allyloxyphenyl group, a phenoxyphenyl group, a methylthiophenyl group, a tolylthiophenyl group, an ethylaminophenyl group, a diethylaminophenyl group, a morpholinophenyl group, an acetyloxyphenyl group, a benzoyloxyphenyl group, an N-cyclohexylcarbamoyloxyphenyl group, an N-phenylcarbamoyloxyphenyl group, an acetylaminophenyl group, an N-methyl-benzoylaminophenyl group, a carboxyphenyl group, a methoxycarbonylphenyl group, an allyloxycarbonylphenyl group, a chlorophenoxycarbonylphenyl group, a carbamoylphenyl group, an N-methylcarbamoylphenyl group, an N,N-dipropylcarbamoylphenyl group, an N-(methoxyphenyl)carbamoylphenyl group, an N-methyl-N-(sulfophenyl)carbamoylphenyl group, a sulfophenyl group, a sulfonatophenyl group, a sulfamoylphenyl group, an N-ethylsulfamoylphenyl group, an N,N-dipropylsulfamoylphenyl group, an N-tolylsulfamoylphenyl group, an N-methyl-N-(phosphonophenyl)sulfamoylphenyl group, a phosphonophenyl group, a phosphonatophenyl group, a diethylphosphonophenyl group, a diphenylphosphonophenyl group, a methylphosphonophenyl group, a methylphosphonatophenyl group, a tolylphosphonophenyl group, a tolylphosphonatophenyl group, an allylphenyl group, a 1-propenylmethylphenyl group, a 2-butenylphenyl group, a 2-methylallylphenyl group, a 2-methylpropenylphenyl group, a 2-propynylphenyl group, a 2-butynylphenyl group and a 3-butynylphenyl group.

As the alkenyl group, substituted alkenyl group, alkynyl group and substituted alkynyl group ($-C(R^{02})=C(R^{03})(R^{04})$ and $-C\equiv C(R^{05})$), those wherein $R^{02}$, $R^{03}$, $R^{04}$ and $R^{05}$ each represents a group constituting from a monovalent non-metallic atomic group can be used. Preferable examples of each of $R^{02}$, $R^{03}$, $R^{04}$ and $R^{05}$ include a hydrogen atom, a halogen atom, an alkyl group, a substituted alkyl group, an aryl group and a substituted aryl group. Specific examples thereof include those described above. More preferable examples of each of $R^{02}$, $R^{03}$, $R^{04}$ and $R^{05}$ include a hydrogen atom, a halogen atom and a straight-chain, branched or cyclic alkyl group having from 1 to 10 carbon atoms.

Specific preferable examples of the alkenyl group, substituted alkenyl group, alkynyl group and substituted alkynyl group include a vinyl group, a 1-propenyl group, a 1-butenyl group, a 1-pentenyl group, a 1-hexenyl group, a 1-octenyl group, a 1-methyl-1-propenyl group, a 2-methyl-1-propenyl group, 2-methyl-1-butenyl group, a 2-phenyl-1-ethenyl group, a 2-chloro-1-ethenyl group, an ethynyl group, a 1-propynyl group, a 1-butynyl group and a phenylethynyl group.

As the heterocyclic group, a pyridyl group or the like as described for the substituent of the substituted alkyl group.

As the substituted oxy group ($R^{06}O-$), a substituted oxy group wherein $R^{06}$ represents a group constituting from a monovalent non-metallic atomic group (exclusive of a hydrogen atom) can be used. Preferable examples of the substituted oxy group include an alkoxy group, an aryloxy group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, a phosphonoxy group and a phosphonatoxy group. The alkyl group and aryl group in the above-described substituted oxy group include those described for the alkyl group, substituted alkyl group, aryl group and substituted aryl group above. As an acyl group ($R^{07}CO-$) in the acyloxy group, an acyl group wherein $R^{07}$ represents the alkyl group, substituted alkyl group, aryl group or substituted aryl group described above is exemplified. Of the substituted oxy groups, an alkoxy group, an aryloxy group, an acyloxy group and an arylsulfoxy group are more preferable. Specific preferable examples of the substituted oxy group include a methoxy group, an ethoxy group, a propyloxy group, an isopropyloxy group, a butyloxy group, a pentyloxy group, a hexyloxy group, a dodecyloxy group, a benzyloxy group, an allyloxy group, a phenethyloxy group, a carboxyethyloxy group, a methoxycarbonylethyloxy group, an ethoxycarbonylethyloxy group, a methoxyethoxy group, a phenoxyethoxy group, a methoxyethoxyethoxy group, an ethoxyethoxyethoxy group, a morpholinoethoxy group, a morpholinopropyloxy group, an allyloxyethoxyethoxy group, a phenoxy group, a tolyloxy group, a xylyloxy group, a mesityloxy group, a mesityloxy group, a cumenyloxy group, a methoxyphenyloxy group, an ethoxyphenyloxy group, a chlorophenyloxy group, a bromophenyloxy group, an acetyloxy group, a benzoyloxy group, a naphthyloxy group, a phenylsulfonyloxy group, a phosphonoxy group and a phosphonatoxy group.

As the substituted amino group including an amido group ($R^{08}NH-$ or $(R^{09})(R^{010})N-$), a substituted amino group wherein $R^{08}$, $R^{09}$ and $R^{010}$ each represents a group constituting from a monovalent non-metallic atomic group (exclusive of a hydrogen atom) can be used. $R^{09}$ and $R^{010}$ may be connected with each other to form a ring. Preferable examples of the substituted amino group include an N-alkylamino group, an N,N-dialkylamino group, an N-arylamino group, an N,N-diarylamino group, an N-alkyl-N-arylamino group, an acylamino group, an N-alkylacylamino group, an N-arylacylamino group, a ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N'-alkyl-N'-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group and an N-aryl-N-aryloxycarbonylamino group. The alkyl group and aryl group in the above-described substituted amino group include those described for the alkyl group, substituted alkyl group, aryl group and substituted aryl group above. In the acyl group ($R^{O7}CO$—) of the acylamino group, N-alkylacylamino group or N-arylacylamino group described above, $R^{O7}$ has the same meaning as described above. Of the substituted amino groups, an N-alkylamino group, an N,N-dialkylamino group, an N-arylamino group and an acylamino group are more preferable. Specific preferable examples of the substituted amino group include a methylamino group, an ethylamino group, a diethylamino group, a morpholino group, a piperidino group, a pyrrolidino group, a phenylamino group, a benzoylamino group and an acetylamino group.

As the substituted sulfonyl group ($R^{O11}$—$SO_2$—), a substituted sulfonyl group wherein $R^{O11}$ represents a group consisting of a monovalent non-metallic atomic group can be used. Preferable examples of the substituted sulfonyl group include an alkylsulfonyl group and an arylsulfonyl group. The alkyl group and aryl group in the above-described substituted sulfonyl group include those described for the alkyl group, substituted alkyl group, aryl group and substituted aryl group above. Specific examples of the substituted sulfonyl group include a butylsulfonyl group, a phenylsulfonyl group and a chlorophenylsulfonyl group.

The sulfonato group ($-SO_3^-$) means a conjugate base anionic group of a sulfo group ($-SO_3H$) as described above. Ordinarily, it is preferred to use together with a counter cation. Examples of the counter cation include those conventionally known, for example, various oniums (e.g., an ammonium, a sulfonium, a phosphonium, an iodonium or an azinium) and metal ions (e.g., $Na^+$, $K^+$, $Ca^{2+}$ or $Zn^{2+}$).

As the substituted carbonyl group ($R^{O13}$—CO—), a substituted carbonyl group wherein $R^{O13}$ represents a group consisting of a monovalent non-metallic atomic group can be used. Preferable examples of the substituted carbonyl group include a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group and an N-alkyl-N-arylcarbamoyl group. The alkyl group and aryl group in the above-described substituted carbonyl group include those described for the alkyl group, substituted alkyl group, aryl group and substituted aryl group above. Of the substituted carbonyl groups, a formyl group, an acyl group, a carboxyl group, an alkoxycarbonyl group, an aryloxycarbonyl group, a carbamoyl group, an N-alkylcarbamoyl group, an N,N-dialkylcarbamoyl group and an N-arylcarbamoyl group are more preferable, and a formyl group, an acyl group, an alkoxycarbonyl group and an aryloxycarbonyl group are stiff more preferable. Specific preferable examples of the substituted carbonyl group include a formyl group, an acetyl group, a benzoyl group, a carboxyl group, a methoxycarbonyl group, an ethoxycarbonyl group, an allyloxycarbonyl group, a dimethylaminophenylethenylcarbonyl group, a methoxycarbonylmethoxycarbonyl group, an N-methylcarbamoyl group, an N-phenylcarbamoyl group, an N,N-diethylcarbamoyl group and a morpholinocarbonyl group.

As the substituted sulfinyl group ($R^{O14}$—SO—), a substituted sulfinyl group wherein $R^{O14}$ represents a group consisting of a monovalent non-metallic atomic group. Preferable examples of the substituted sulfinyl group include an alkylsulfinyl group, an arylsulfinyl group, a sulfinamoyl group, an N-alkylsulfinamoyl group, an N,N-dialkylsulfinamoyl group, an N-arylsulfinamoyl group, an N,N-diarylsulfinamoyl group and an N-alkyl-N-arylsulfinamoyl group. The alkyl group and aryl group in the above-described substituted sulfinyl group include those described for the alkyl group, substituted alkyl group, aryl group and substituted aryl group above. Of the substituted sulfinyl groups, an alkylsulfinyl group and an arylsulfinyl group are more preferred. Specific examples of the substituted sulfinyl group include a hexylsulfinyl group, a benzylsulfinyl group and a tolylsulfinyl group.

The substituted phosphono group means a group formed by substituting one or two hydroxy groups of a phosphono group with one or two other organic oxy groups. Preferable examples of the substituted phosphono group include a dialkylphosphono group, a diarylphosphono group, an alkylarylphosphono group, a monoalkylphosphono group and a monoarylphosphono group as described above. Of the substituted phosphono groups, a dialkylphosphono group and a diarylphosphono group are more preferred. Specific examples of the substituted phosphono group include a diethylphosphono group, a dibutylphosphono group and a diphenylphosphono group.

The phosphonato group ($-PO_3^{2-}$ or $-PO_3H^-$) means a conjugate base anionic group of a phosphono group ($-PO_3H_2$) resulting from primary acid dissociation or secondary acid dissociation as described above. Ordinarily, it is preferred to use together with a counter cation. Examples of the counter cation include those conventionally known, for example, various oniums (e.g., an ammonium, a sulfonium, a phosphonium, an iodonium or an azinium) and metal ions (e.g., $Na^+$, $K^+$, $C^{2+}$ or $Zn^{2+}$).

The substituted phosphonato group means a conjugate base anionic group of a group formed by substituting one hydroxy group with another organic oxy group of the substituted phosphono group described above. Specific examples of the substituted phosphonato group include a conjugate base group of a monoalkylphosphono group ($-PO_3H(alkyl)$) and a conjugate base group of a monoarylphosphono group ($-PO_3H(aryl)$).

Now, X in formula (I) and $X^1$ in formula (I-2) are described below. X represents a divalent connecting group selected from —O—, —S—, —$SO_2$—, —NH—, —$N(R^3)$— and CO—. Among them, —O—, —S—, —NH— and —$N(R^3)$— are more preferable, and —O— and —$N(R^3)$— are particularly preferable from the stand point of sensitivity.

$X^1$ represents a divalent connecting group selected from —O—, —S—, —$SO_2$—, —NH—, —$N(R^3)$— and —CO—. Among them, —NH— and —$N(R^3)$— are preferable from the stand point of sensitivity, and —$N(R^3)$— is most preferable from the stand point of sensitivity and preservation stability.

Herein, $R^3$ in X and $R^3$ in $X^1$ each independently represents a hydrogen atom or a monovalent substituent. The monovalent substituent has the same meaning as that defined for $R^1$ and $R^2$ in formula (I).

In particular, $R^3$ is preferably an alkyl group, an alkenyl group, alkynyl group, an aryl group or a heterocyclic group, each of which may have a substituent. Also, it is preferred for $R^3$ to contain at least one of —$CO_2$— and —$CON(R^8)$—. A most preferable structure of $R^3$ is a structure containing an ester structure represented by formula (i) shown below or a structure containing an amido structure represented by formula (ii) shown below, and the structure containing an amido structure represented by formula (ii) is especially preferable.

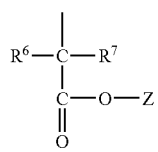
(i)

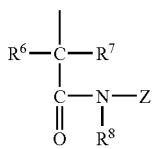
(ii)

In the above formulae, $R^6$, $R^7$ and $R^8$ each independently represents a hydrogen atom or a monovalent substituent, and Z represents a monovalent substituent. The monovalent substituent has the same meaning as that defined for $R^1$ and $R^2$ in formulae (I) and (I-2).

Specific examples (A-1) to (A-87) of the mono-carboxylic acid compound represented by formula (I-2) are set forth below, but the invention should not be construed as being limited thereto.

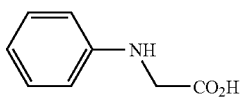
(A-1)

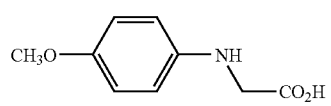
(A-2)

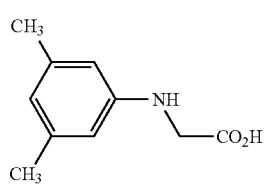
(A-3)

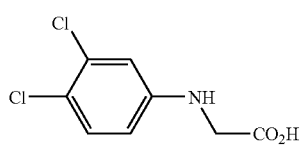
(A-4)

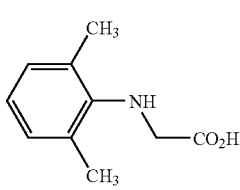
(A-5)

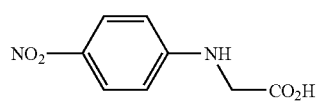
(A-6)

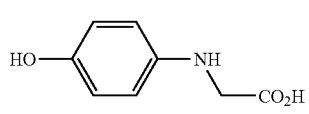
(A-7)

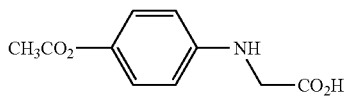
(A-8)

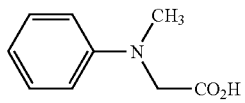
(A-9)

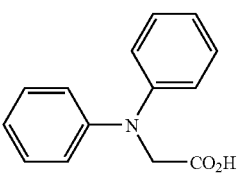
(A-10)

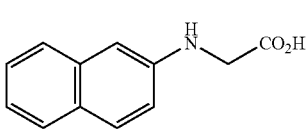
(A-11)

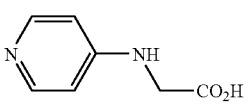
(A-12)

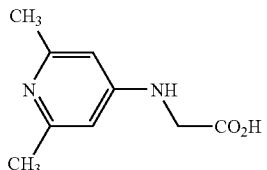
(A-13)

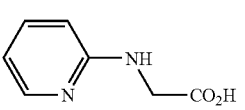
(A-14)

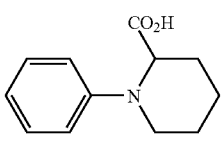
(A-15)

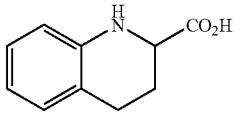
(A-16)

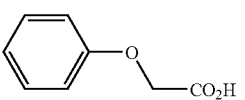
(A-17)

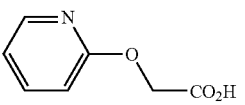
(A-18)

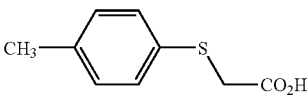
(A-19)

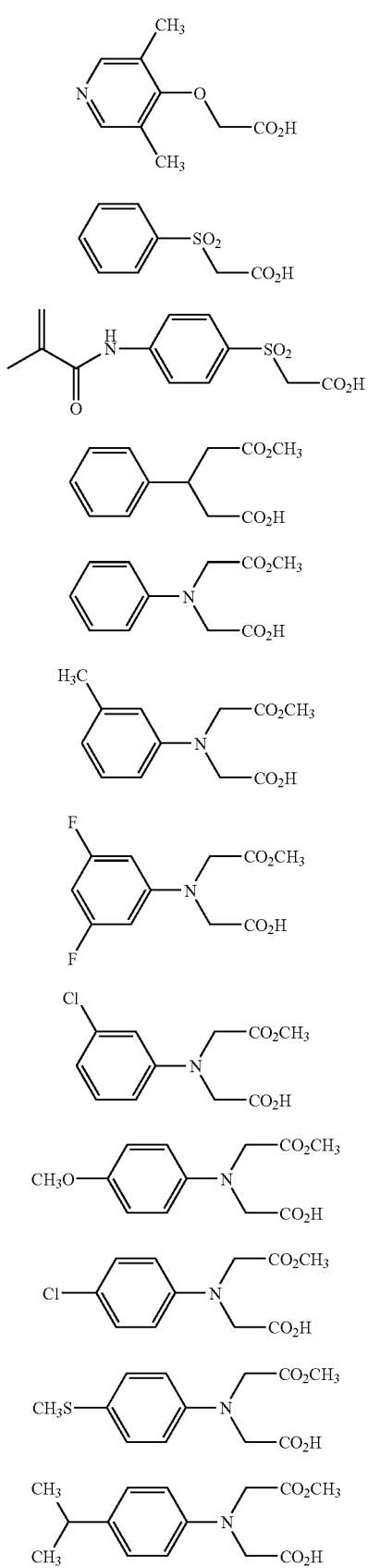
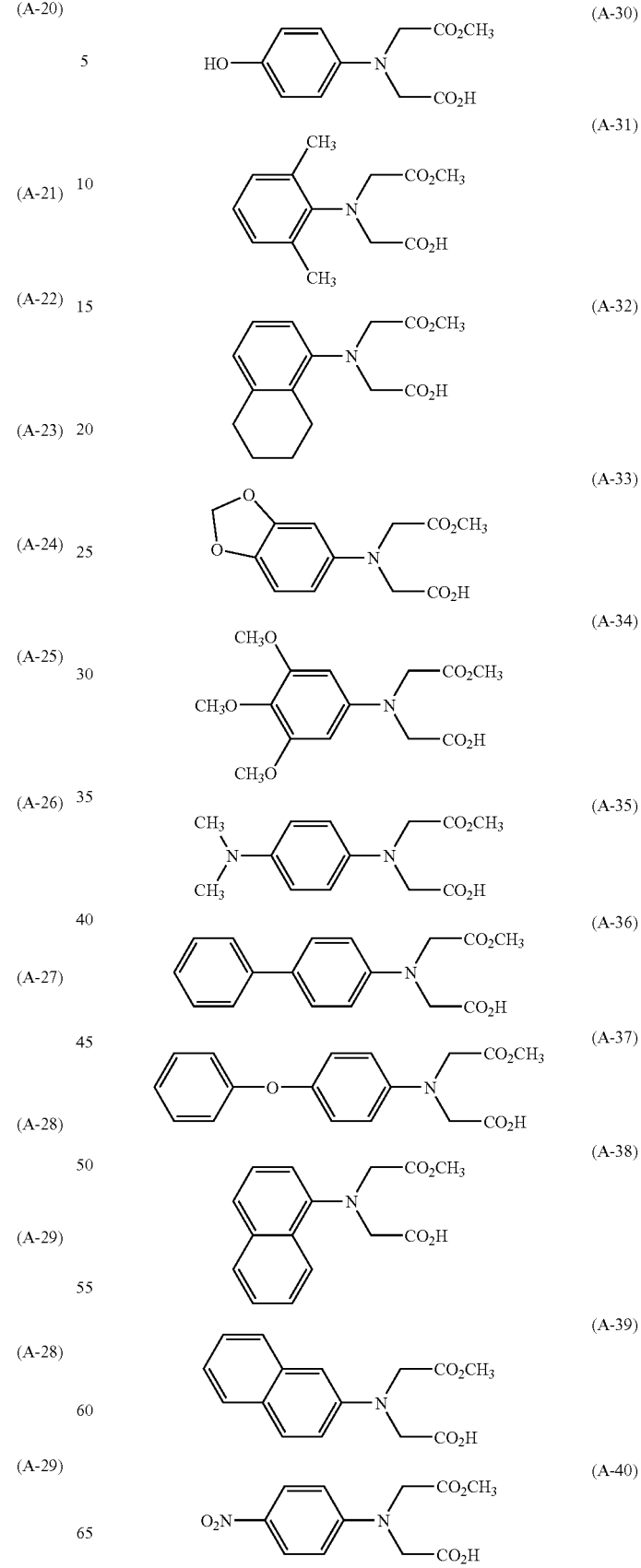

-continued
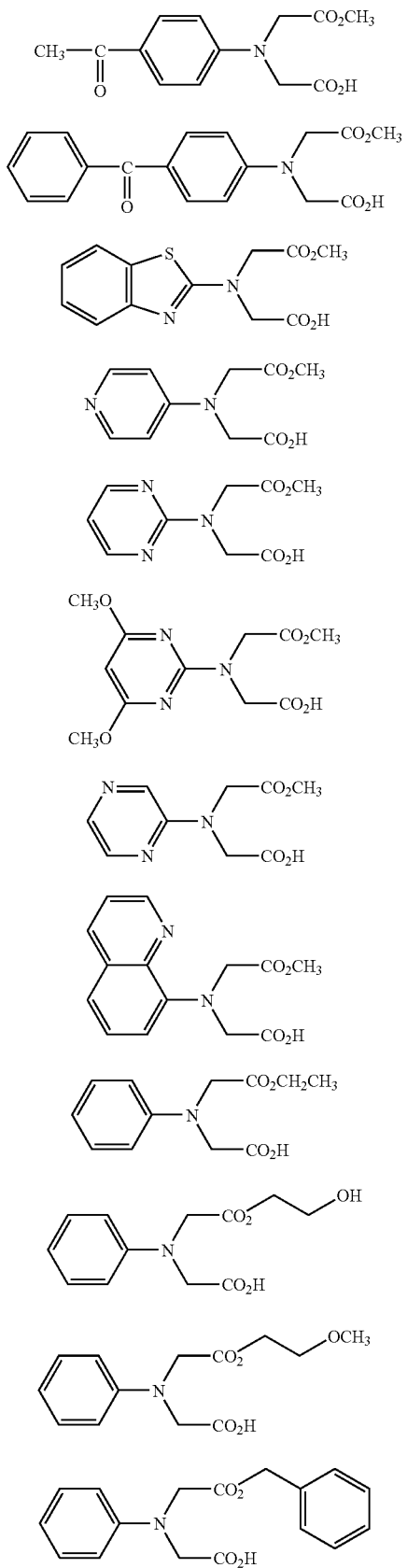
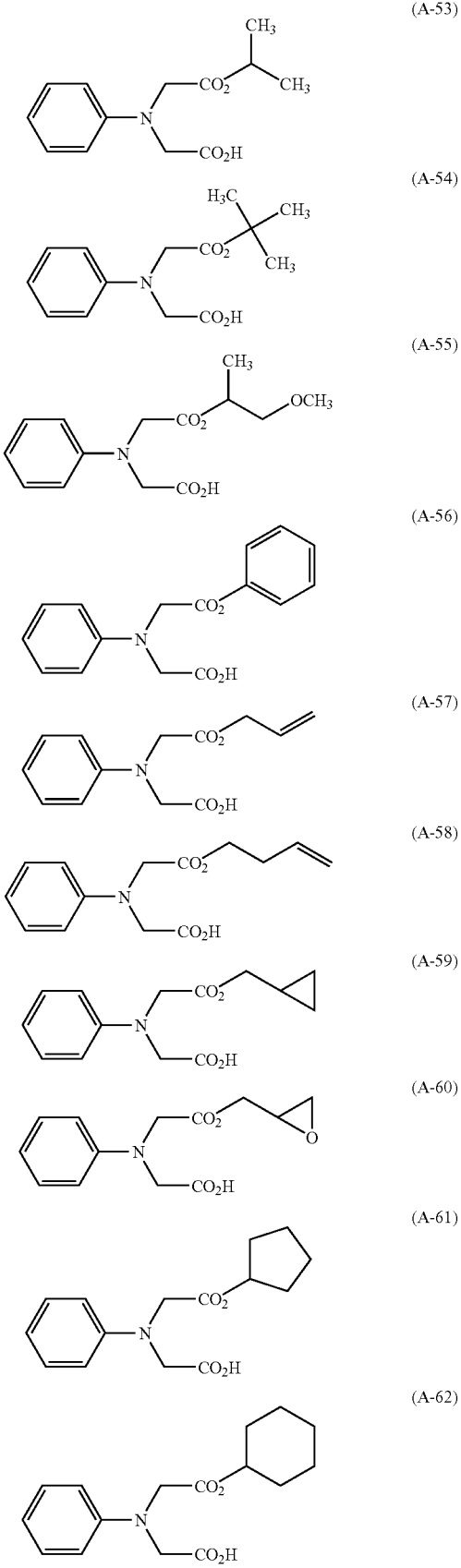

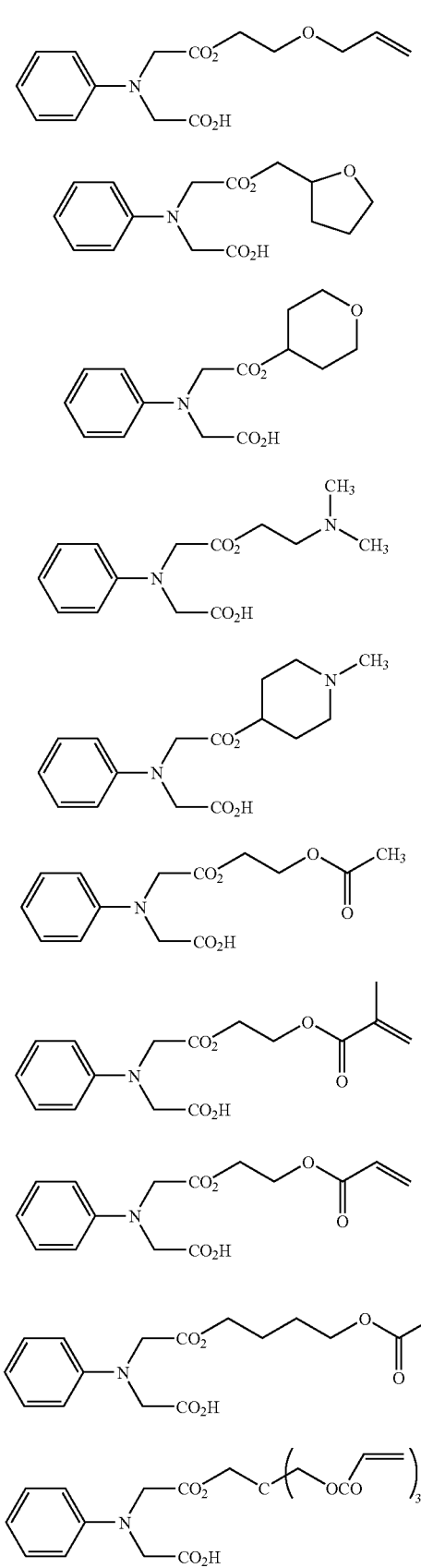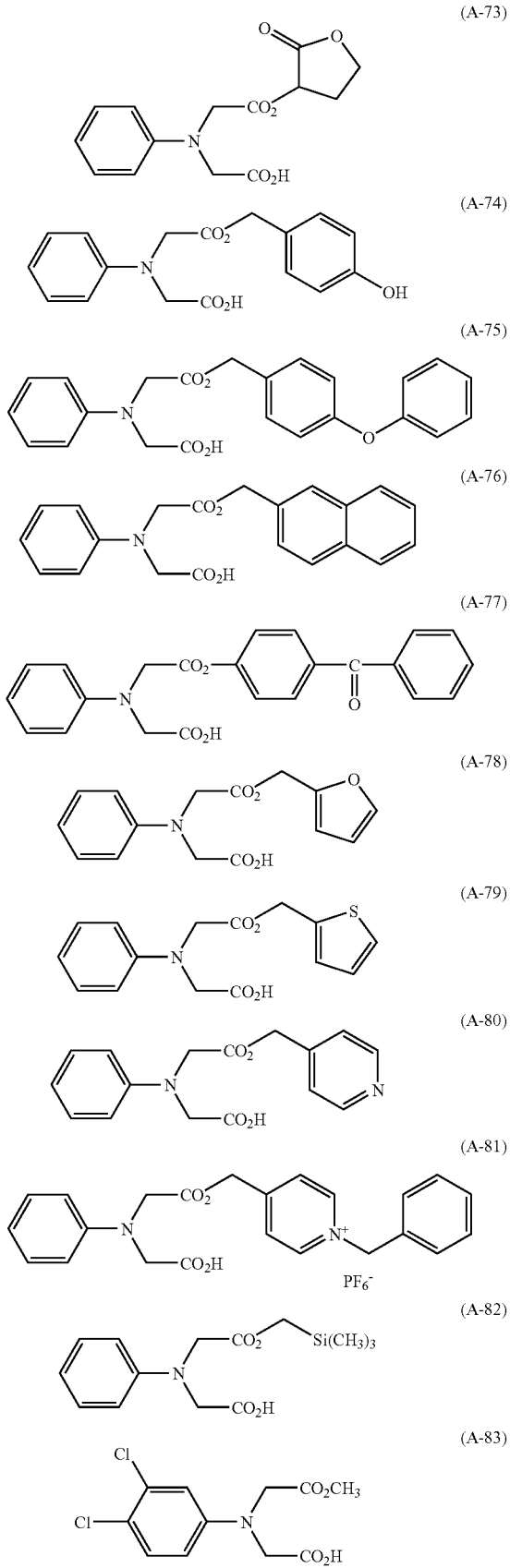

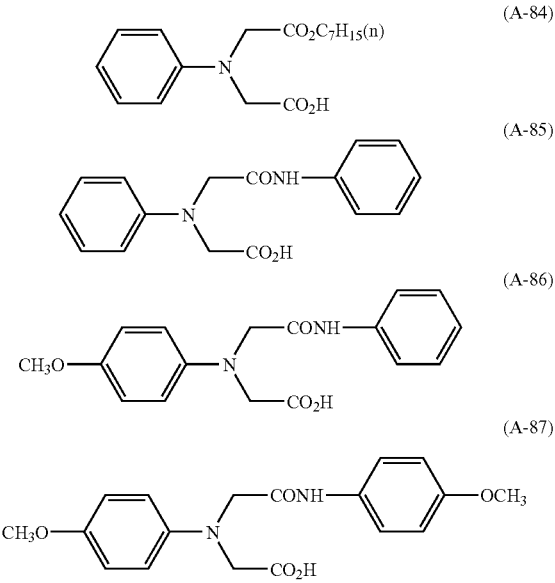

As another preferable example of the compound (A), a compound represented by formula (I-3) shown below which has a structure wherein a plurality of the groups represented by formula (I) are connected to the ring structure represented by A in the compound represented by formula (I-2) is exemplified.

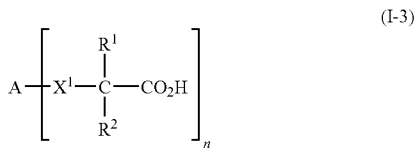

In formula (I-3), A, $R^1$ and $R^2$ have the same meanings as those defined in formula (I) respectively, provided that at least one of $R^1$ and $R^2$ represents a carboxyl group, an alkyl group having from 1 to 10 carbon atoms or an alkyl group having from 1 to 10 carbon atoms and including a carboxy group attached to its terminal, and n represents an integer of 2 to 6.

Representative synthesis examples of the mono-carboxylic acid compound represented by formula (I-2) according to the invention are described below, but the invention should not be construed as being limited thereto.

<Synthesis of Compound (A-24)>

Into a 2-liter round-bottom flask was put 62.8 g of N-phenyliminodiacetic acid under nitrogen gas stream to dissolve with 500 ml of toluene. To the solution was added 32.0 g of acetic anhydride, and the mixture was refluxed by heating with stirring. After lapse of one our, the mixture was cooled to room temperature and 3 liters of hexane was added thereto with stirring to deposit. The deposit was collected by filtration to obtain 52.0 g of N-phenyliminodiacetic acid anhydride.

Into a 200-ml round-bottom flask was put 5.1 g of N-phenyliminodiacetic acid anhydride obtained above under nitrogen gas stream and 60 ml of methanol was added thereto. The mixture was stirred at room temperature for 6 hours and the solvent was distilled off under a reduced pressure. The residue was purified by silica gel chromatography (eluent solvent: hexane/ethyl acetate) to obtain 5.7 g of Compound (A-24). It was confirmed that the product was Compound (A-24) by an NMR spectrum, an IR spectrum and a mass spectrum.

<Synthesis of Compound (A-52)>

Into a 2-liter round-bottom flask was put 62.8 g of N-phenyliminodiacetic acid under nitrogen gas stream to dissolve with 500 ml of toluene. To the solution was added 32.0 g of acetic anhydride, and the mixture was refluxed by heating with stirring. After lapse of one our, the mixture was cooled to room temperature and 3 liters of hexane was added thereto with stirring to deposit. The deposit was collected by filtration to obtain 52.0 g of N-phenyliminodiacetic acid anhydride.

Into a 200-ml round-bottom flask was put 5.1 g of N-phenyliminodiacetic acid anhydride obtained above under nitrogen gas stream and 50 ml of benzyl alcohol was added thereto. The mixture was stirred at room temperature for 8 hours and the solvent was distilled off under a reduced pressure. The residue was purified by silica gel chromatography (eluent solvent: hexane/ethyl acetate) to obtain 7.2 g of Compound (A-52). It was confirmed that the product was Compound (A-52) by an NMR spectrum, an IR spectrum and a mass spectrum.

<Synthesis of Compound (A-55)>

Into a 2-liter round-bottom flask was put 62.8 g of N-phenyliminodiacetic acid under nitrogen gas stream to dissolve with 500 ml of toluene. To the solution was added 32.0 g of acetic anhydride, and the mixture was refluxed by heating with stirring. After lapse of one our, the mixture was cooled to room temperature and 3 liters of hexane was added thereto with stirring to deposit. The deposit was collected by filtration to obtain 52.0 g of N-phenyliminodiacetic acid anhydride.

Into a 200-ml round-bottom flask was put 5.1 g of N-phenyliminodiacetic acid anhydride obtained above under nitrogen gas stream and 50 ml of 1-methoxy-2-propanol was added thereto. The mixture was stirred at room temperature for 4 hours and the solvent was distilled off under a reduced pressure. The residue was purified by silica gel chromatography (eluent solvent: hexane/ethyl acetate) to obtain 6.0 g of Compound (A-55). It was confirmed that the product was Compound (A-55) by an NMR spectrum, an IR spectrum and a mass spectrum.

(Poly-Carboxylic Acid Compound)

As a preferable embodiment of the compound (A), a poly-carboxylic acid compound described below is also exemplified.

The poly-carboxylic acid compound is preferably used in the case where the binder polymer (B) used is a relatively hydrophilic binder polymer from the stand point of compatibility.

As the poly-carboxylic acid compound, an embodiment wherein at least one structure selected from a carboxyl group and a carboxylic acid anhydride structure is connected to a hetero atom through a methylene group which may be substituted is preferable. The substituent for the methylene group has the same meaning as that defined for $R^1$ or $R^2$ in formulae (I) and (I-2).

Examples of the poly-carboxylic acid compound include:
(p-acetamidophenylimido)diactic acid,
3-(bis(carboxymethyl)amino)benzoic acid,
4-(bis(carboxymethyl)amino)benzoic acid,
2-[(carboxymethyl)phenylamino]benzoic acid,
2-[(carboxymethyl)phenylamino]-5-methoxybenzoic acid,
3-[bis(carboxymethyl)amino]-2-naphthalenecarboxylic acid,
N-(4-aminophenyl)-N-(carboxymethyl)glycine, N,N'-1,3-phenylenebisglycine,
N,N'-1,3-phenylenebis[N-(carboxymethyl)]glycine,
N,N'-1,2-phenylenebis[N-(carboxymethyl)]glycine,
N-(carboxymethyl)-N-(4-methoxyphenyl)glycine,
N-(carboxymethyl)-N-(3-methoxyphenyl)glycine,
N-(carboxymethyl)-N-(3-hydroxyphenyl)glycine,
N-(carboxymethyl)-N-(3-chlorophenyl)glycine,
N-(carboxymethyl)-N-(4-bromophenyl)glycine,
N-(carboxymethyl)-N-(4-chlorophenyl)glycine,
N-(carboxymethyl)-N-(2-chlorophenyl)glycine,
N-(carboxymethyl)-N-(4-ethylphenyl)glycine,
N-(carboxymethyl)-N-(2,3-dimethylphenyl)glycine,
N-(carboxymethyl)-N-(3,4-dimethylphenyl)glycine,
N-(carboxymethyl)-N-(3,5-dimethylphenyl)glycine,
N-(carboxymethyl)-N-(2,4-dimethylphenyl)glycine,
N-(carboxymethyl)-N-(2,6-dimethylphenyl)glycine,
N-(carboxymethyl)-N-(4-formylphenyl)glycine,
N-(carboxymethyl)-N-ethylanthranilic acid,
N-(carboxymethyl)-N-propylanthranilic acid,
5-bromo-N-(carboxymethyl)anthranilic acid,
N-(2-carboxyphenyl)glycine,
o-dianisidine-N,N,N',N'-tetraacetic acid,
N,N'-[1,2-ethanediylbis(oxy-2,1-phenylene)]bis[N-(carboxymethyl)glycine],
4-carboxyphenoxyacetic acid,
Catechol-o,o'-diacetic acid,
4-methylcatechol-o,o'-diacetic acid,
resorcinol-o,o'-diacetic acid,
hydroquinone-o,o'-diacetic acid,
α-carboxy-o-anisic acid,
4,4'-isopropylidenediphenoxyacetic acid,
2,2'-(dibenzofuran-2,8-diyldioxy)diacetic acid,
2-(carboxymethylthio)benzoic acid,
5-amino-2-(carboxymethylthio)benzoic acid, and
3-[(carboxymethyl)thio]-2-naphthalenecarboxylic acid.

At least one compound selected from compounds represented by formulae (PC-1) and (PC-2) shown below is preferable.

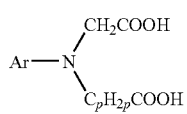
(PC-1)

In formula (PC-1), Ar represents a mono-, poly- or unsubstituted aryl group, and p represents an integer of 1 to 5.

(PC-2)

In formula (PC-2), $R^4$ represents a hydrogen atom or an alkyl group having from 1 to 6 carbon atoms, and k and m each represents an integer of 1 to 5.

In formula (PC-1), the mono-aryl group for Ar means a group including one aromatic ring (for example, a phenyl group), and the poly-aryl group for Ar means a group including a structure wherein two or more aromatic rings are connected through a covalent bond (for example, a biphenyl group).

A substituent which the aryl group in formula (PC-1) may have includes, for example, an alkyl group having from 1 to 3 carbon atoms, an alkoxy group having from 1 to 3 carbon atoms, an alkylthio group having from 1 to 3 carbon atoms and a halogen atom. The aryl group preferably has one to three same or different substituents. In formula (PC-1), p is preferably 1 and Ar is preferably a phenyl group.

In formula (PC-2), m is preferably 1, and $R^4$ is preferably a hydrogen atom.

A most preferable poly-carboxylic acid compound is anilinodiacetic acid.

Further, the compound (A) according to the invention may be a polymer compound.

Of the polymer compounds, a polymer compound having a carboxyl group in its side chain is preferable in view of its ease of synthesis.

In the case of the polymer compound, the weight average molecular weight thereof is preferably from 5,000 to 1,000,000, more preferably from 10,000 to 500,000, and particularly preferably from 15,000 to 300,000.

Particularly, a polymer compound which includes an organic group substituted with a functional group containing N, O or S and at least one carboxyl group in its side chain and in which at least one of the carboxylic group is connected to the above-described hetero atom through a methylene group is preferable.

Specific examples of the polymer compound preferable for the invention are set forth below. In the following examples, the composition is indicated in mole percent.

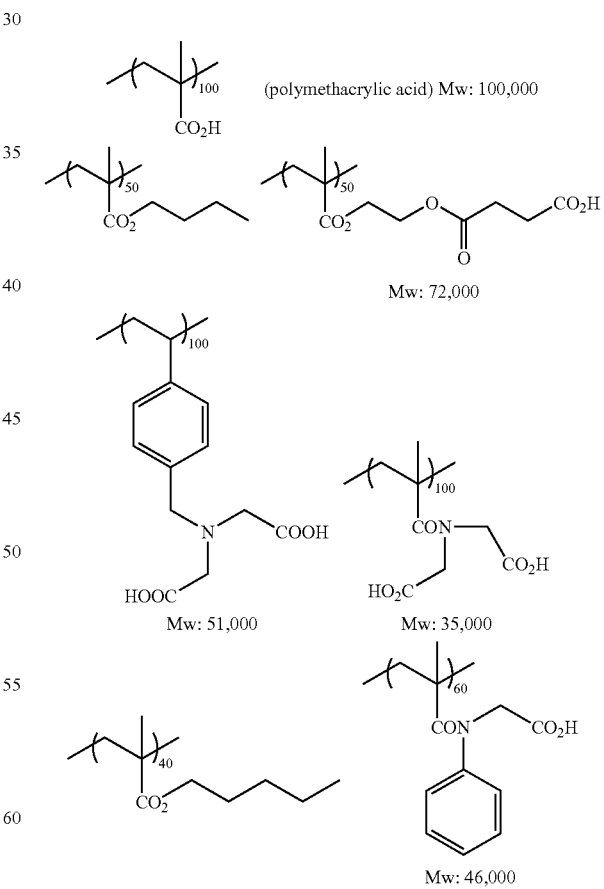

The content of the monomer unit containing a carboxylic acid group in the polymer compound is preferably from 10 to 100%, more preferably from 50 to 100%, particularly preferably from 70 to 100%, based on the mole number of the total monomer constituting the polymer compound.

As the compound (A) according to the invention, a compound including a carboxylic acid anhydride structure is also preferably used. Of such compounds, a compound including a cyclic carboxylic acid anhydride structure is more preferable since the compound is structurally unstable and is apt to be decarboxylated.

Specific examples of the compound including a carboxylic acid anhydride structure preferable for the invention are set forth below.

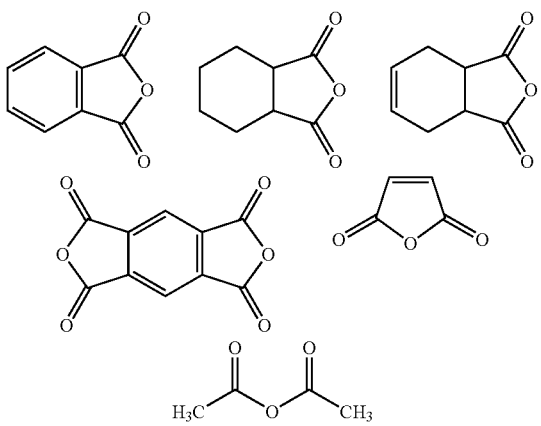

The compounds (A) according to the invention as described above may be used individually or in combination of two or more thereof. The amount of the compound (A) added is preferably from 0.1 to 70% by weight, more preferably from 0.5 to 50% by weight, most preferably from 1 to 30% by weight, based on the total solid content of the resin composition from the standpoint of obtaining a sufficient sensitivity increasing effect.

(B) Binder Polymer

The binder polymer included in the laser-decomposable resin composition according to the invention is preferably a binder polymer compound having a carbon-carbon unsaturated bond in any one of its main chain and side chain. A polymer containing any one of an olefin bond (carbon-carbon double bond) and a carbon-carbon triple bond in its main chain is more preferable in view of high mechanical strength of a layer formed, and a polymer containing the olefin bond in its main chain is particularly preferable.

The polymer containing any one of an olefin bond and a carbon-carbon triple bond in its main chain includes, for example, SB (polystyrene-polybutadiene), SBS (polystyrene-polybutadiene-polystyrene), SIS (polystyrene-polyisoprene-polystyrene) or SEBS (polystyrene-polyethylene/polybutylene-polystyrene).

When a polymer containing a polymerizable unsaturated group having a high reactivity, for example, a methacryloyl group, is used as the polymer having a carbon-carbon unsaturated bond in its side chain, a layer having an extremely high mechanical strength can be prepared. In particular, as for a polyurethane-series or polyester-series thermoplastic elastomer, it is possible to introduce relatively easily the polymerizable unsaturated group having a high reactivity into its molecule. The terminology "to introduce into its molecule" as used herein means and includes cases wherein the polymerizable unsaturated group is bonded at either both terminals or one terminal of the polymer main chain, at a terminal of the polymer side chain, or directly to the polymer main chain or side chain. Specifically, for instance, the polymer having the polymerizable unsaturated group directly introduced at the terminal of the molecule thereof may be used. Alternatively, other method, for example, a method is preferably employed in which a component having a molecular weight of about several thousands and including plural reactive groups, for example, a hydroxy group, an amino group, an epoxy group, a carboxyl group, an acid anhydride group, a ketone group, a hydrazine residue, an isocyanate group, an isothiocyanate group, a cyclic carbonate group or an ester group is reacted with a bonding agent having plural groups capable of connecting with the above-described reactive group (for example, a polyisocyanate group reacting with the hydroxy group or amino group) to conduct the adjustment of molecular weight and conversion to a terminal bonding group and then the resulting compound is reacted with an organic compound having a group capable of reacting with the terminal bonding group and a polymerizable unsaturated group to introduce the polymerizable unsaturated group into the terminal.

Although the polymer having a carbon-carbon unsaturated bond as described above is preferable for the binder polymer included in the laser-decomposable resin composition according to the invention, a polymer not having a carbon-carbon unsaturated bond may be used. The polymer not having a carbon-carbon unsaturated bond includes, for example, a resin easily prepared by adding hydrogen to the olefin portion of the above-described polymer having a carbon-carbon unsaturated bond or a resin easily prepared by polymerization using a starting material previously added hydrogen to its olefin portion (for example, a compound which is obtained by hydrogenation of butadiene, isoprene or the like).

The number average molecular weight of the binder polymer is preferably in a range of 1,000 to 1,000,000, more preferably in a range of 5,000 to 500,000. When the number average molecular weight thereof is in the range of 1,000 to 1,000,000, the mechanical strength of the layer formed can be ensured. The term "number average molecular weigh" as used herein means a molecular weight obtained by measuring using gel permeation chromatography (GPC) and calculating in terms of standard polystyrene of a known molecular weight.

The total amount of the binder polymer in the laser-decomposable resin composition according to the invention is ordinarily from 1 to 99% by weight, preferably from 5 to 80% by weight, based on the total solid content of the resin composition.

The polymer having a carbon-carbon unsaturated bond described above may be used together with a conventional resin described below.

The amount of the resin used together is ordinarily from 1 to 90% by weight, preferably from 5 to 80% by weight, based on the polymer having a carbon-carbon unsaturated bond.

The resin used together may be an elastomer or a non-elastomer.

The number average molecular weight of the resin used together is preferably in a range of 1,000 to 1,000,000, more preferably in a range of 5,000 to 500,000. When the number average molecular weight thereof is in the range of 1,000 to 1,000,000, the mechanical strength of the layer formed can be ensured. The term "number average molecular weigh" as used herein means a molecular weight obtained by measuring using gel permeation chromatography (GPC) and calculating in terms of standard polystyrene of a known molecular weight.

As the resin used together, a resin easily liquefiable or a resin easily decomposable is preferable. The resin easily decomposable preferably contains in the molecular chain as a monomer unit easily decomposable, for example, a monomer unit derived from styrene, α-methylstyrene, α-methoxystyrene, an acryl ester, a methacryl ester, an ester compound, an ether compound, a nitro compound, a carbonate compound, a carbamoyl compound, a hemiacetal ester compound, an oxyethylene compound or an aliphatic cyclic compound. In particular, a polyether, for example, polyethylene glycol, polypropylene glycol or polytetraethylene glycol, an aliphatic polycarbonate, an aliphatic polycarbamate, polymethyl methacrylate, polystyrene, nitrocellulose, polyoxyethylene, polynorbornene, hydrogenated polycyclohexadiene or a polymer having a molecular structure of many branched structures, for example, a dendrimer is the representative example of the resin easily decomposable. Also, a polymer containing a lot of oxygen atoms in the molecular chain is preferable from the standpoint of the decomposability. Among them, the compound having a carbonate group, a carbamate group or a methacryl group in the polymer main chain is preferable in view of the high heat decomposability. For instance, a polyester or polyurethane synthesized using as the raw material, (poly)carbonatediol or (poly)carbonate dicarboxylic acid or a polyamide synthesized using as the raw material, (poly)carbonate diamine is illustrated as a preferable example of the polymer of good heat decomposability. The polymer may contain a polymerizable unsaturated group in the main chain or side chain thereof. In particular, when the polymer has a reactive functional group, for example, a hydroxy group, an amino group or a carboxyl group at the terminal, it is easy to introduce the polymerizable unsaturated group.

The thermoplastic elastomer is not particularly restricted and includes, for example, a urethane-series thermoplastic elastomer, an ester-series thermoplastic elastomer, an amide-series thermoplastic elastomer or a silicone-series thermoplastic elastomer. In order to more increase the heat decomposability, a polymer wherein an easily decomposable functional group, for example, a carbamoyl group or a carbonate group is introduced into its main chain can be used. Also, it may be used as a mixture with a polymer of higher heat decomposability. Since the thermoplastic elastomer is fluidized by heating, it is possible to mix with the complex for use in the invention. The term "thermoplastic elastomer" as used herein means a material which exhibits rubber elasticity at ambient temperature and is fluidized by heating to undergo fabrication as an ordinary thermoplastic plastic. With respect to the molecular structure, the thermoplastic elastomer comprises a soft segment like a polyether or a rubber molecule and a hard segment which prevents plastic deformation around ambient temperature as vulcanized rubber. As the hard segment, various types, for example, a frozen phase, a crystalline phase, a hydrogen bond or an ionic crosslinkage are present.

The kind of thermoplastic elastomer can be selected depending on the use of the resin composition. For instance, in the field requiring solvent resistance, a urethane-series, ester-series, amide-series or fluorine-series thermoplastic elastomer is preferable and in the field requiring heat resistance, a urethane-series, olefin-series, ester-series or fluorine-series thermoplastic elastomer is preferable. Further, the hardness can be widely changed depending on the kind of thermoplastic elastomer.

The non-elastomeric thermoplastic resin is not particularly restricted and includes, for example, a polyester resin, an unsaturated polyester resin, a polyamide resin, a polyamide-imide resin, a polyurethane resin, an unsaturated polyurethane resin, a polysulfone resin, a polyethersulfone resin, a polyimide resin, a polycarbonate resin and a full aromatic polyester resin.

A hydrophilic polymer may be used as the resin used together. The hydrophilic polymer includes, for example, a hydrophilic polymer containing hydroxyethylene as a constituting unit. Specifically, polyvinyl alcohol, a vinyl alcohol/vinyl acetate copolymer (partially saponified polyvinyl alcohol) and a modified product thereof are exemplified. The hydrophilic polymers may be used individually or in combination of two or more thereof. Examples of the modified product include a polymer wherein at least a part of hydroxy groups are modified to carboxyl groups, a polymer wherein at least a part of hydroxy groups are modified to (meth)acryloyl groups, a polymer wherein at least a part of hydroxy groups are modified to amino groups, and a polymer having ethylene glycol, propylene glycol or a dimer thereof introduced into its side chain.

The polymer wherein at least a part of hydroxy groups are modified to carboxyl groups can be obtained by esterification of polyvinyl alcohol or partially saponified polyvinyl alcohol with a polyfunctional carboxylic acid, for example, succinic acid, maleic acid or adipic acid.

The polymer wherein at least a part of hydroxy groups are modified to (meth)acryloyl groups can be obtained by addition of a glycidyl group-containing ethylenically unsaturated monomer to the above-described carboxyl group-modified polymer or by esterification of polyvinyl alcohol or partially saponified polyvinyl alcohol with (meth)acrylic acid.

The polymer wherein at least a part of hydroxy groups are modified to amino groups can be obtained by esterification of polyvinyl alcohol or partially saponified polyvinyl alcohol with a carboxylic acid containing an amino group, for example, carbamic acid.

The polymer having ethylene glycol, propylene glycol or a dimer thereof introduced into its side chain can be obtained by heating polyvinyl alcohol or partially saponified polyvinyl alcohol together with a glycol in the presence of a sulfuric acid catalyst and removing water as a byproduct from the reaction system.

Of the hydrophilic polymers, the polymer wherein at least a part of hydroxy groups are modified to (meth)acryloyl groups is particularly preferably used. This is because by the direct introduction of an unreacted crosslinkable functional group to a polymer component, strength of the layer formed can be increased so that both flexibility and strength of the layer formed can be achieved.

The weight average molecular weight (measured by GPC and calculated in terms of polystyrene) of the hydrophilic polymer is preferably from 10,000 to 500,000. When the weight average molecular weight is 10,000 or more, the polymer is excellent in the configuration retention property as a resin alone. When the weight average molecular weight is 500,000 or less, the polymer is easily soluble in a solvent, for example, water and advantageous to the preparation of a crosslinkable resin composition.

Further, the resin used together may be a solvent-soluble resin. Specific examples thereof include a polysulfone resin, a polyethersulfone resin, an epoxy resin, an alkyd resin, a polyolefin resin and a polyester resin.

The resin used together does not ordinarily have a polymerizable unsaturated group having a high reactivity. However, it may have the polymerizable unsaturated group having a high reactivity at the terminal of the molecular chain or in the side chain. When a polymer having the polymerizable unsaturated group having a high reactivity, for example, a methacryloyl group is used, a layer having the extremely high mechanical strength can be prepared. In particular, as for the polyurethane-series or polyester-series thermoplastic elastomer, the polymerizable unsaturated group having a high reactivity can be introduced into the molecule thereof with comparative ease. The terminology "be introduced into the molecule" as used herein means and includes cases wherein the polymerizable unsaturated group is directly bonded at both terminals or one terminal of the polymer main chain, at a terminal of the polymer side chain, or in the polymer main chain or side chain. Specifically, for instance, the resin having the polymerizable unsaturated group directly introduced at the terminal of molecule may be used. Alternatively, other method, for example, a method is preferably employed in which a compound having a molecular weight of about several thousands and including plural reactive groups, for example, a hydroxy group, an amino group, an epoxy group, a carboxyl group, an acid anhydride group, a ketone group, a hydrazine residue, an isocyanate group, an isothiocyanate group, a cyclic carbonate group or an ester group is reacted with a bonding agent (for example, a polyisocyanate group reacting with a hydroxy group or amino group) having a group capable of connecting with the reactive group of the above compound to conduct the adjustment of molecular weight and conversion to a terminal bonding group and then the resulting compound is reacted with an organic compound having a group capable of reacting with the terminal bonding group and a polymerizable unsaturated group to introduce the polymerizable unsaturated group into the terminal.

The laser-decomposable resin composition according to the invention may contain a polymerizable compound (monomer), an initiator and other components, if desired, in addition to the components (A) and (B) described above. The polymerizable compound (monomer), initiator and other components will be described hereinafter.

(C) Polymerizable Compound (Monomer)

The polymerizable compound (monomer) is described in greater detail below taking a case wherein an addition polymerizable compound is used as an example.

<Addition Polymerizable Compound>

The addition-polymerizable compound having at least one ethylenically unsaturated double bond which is the polymerizable compound preferably used in the invention is selected from compounds having at least one, preferably two or more, terminal ethylenically unsaturated double bonds. Such compounds are widely known in the field of art and they can be used in the invention without any particular limitation. The compound has a chemical form, for example, a monomer, a prepolymer, specifically, a dimer, a trimer or an oligomer, or a copolymer thereof, or a mixture thereof. Examples of the monomer include unsaturated carboxylic acids (for example, acrylic acid, methacrylic acid, itaconic acid, crotonic acid, isocrotonic acid or maleic acid) and esters or amides thereof. Preferably, esters of an unsaturated carboxylic acid with an aliphatic polyhydric alcohol compound and amides of an unsaturated carboxylic acid with an aliphatic polyvalent amine compound are used. An addition reaction product of an unsaturated carboxylic acid ester or amide having a nucleophilic substituent, for example, a hydroxy group, an amino group or a mercapto group, with a monofunctional or polyfunctional isocyanate or epoxy, or a dehydration condensation reaction product of the unsaturated carboxylic acid ester or amide with a monofunctional or polyfunctional carboxylic acid is also preferably used. Furthermore, an addition reaction product of an unsaturated carboxylic acid ester or amide having an electrophilic substituent, for example, an isocyanato group or an epoxy group with a monofunctional or polyfunctional alcohol, amine or thiol, or a substitution reaction product of an unsaturated carboxylic acid ester or amide having a releasable substituent, for example, a halogen atom or a tosyloxy group with a monofunctional or polyfunctional alcohol, amine or thiol is also preferably used. In addition, compounds in which the unsaturated carboxylic acid described above is replaced by an unsaturated phosphonic acid, styrene, vinyl ether or the like can also be used.

Specific examples of the monomer, which is an ester of an aliphatic polyhydric alcohol compound with an unsaturated carboxylic acid, include acrylic acid esters, for example, ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate or polyester acrylate oligomer;

methacrylic acid esters, for example, tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl] dimethylmethane or bis[p-(methacryloxyethoxy)phenyl] dimethylmethane;

itaconic acid esters, for example, ethylene glycol diitaconate, propylene glycol diitaconate, 1,3-butanediol diitaconate, 1,4-butanediol diitaconate, tetramethylene glycol diitaconate, pentaerythritol diitaconate or sorbitol tetraitaconate;

crotonic acid esters, for example, ethylene glycol dicrotonate, tetramethylene glycol dicrotonate, pentaerythritol dicrotonate or sorbitol tetracrotonate;

isocrotonic acid esters, for example, ethylene glycol diisocrotonate, pentaerythritol diisocrotonate or sorbitol tetraisocrotonate; and maleic acid esters, for example, ethylene glycol dimaleate, triethylene glycol dimaleate, pentaerythritol dimaleate and sorbitol tetramaleate.

Other examples of the ester, which can be preferably used, include aliphatic alcohol esters described in JP-B-46-27926 (the term "JP-B" as used herein means an "examined Japanese patent publication"), JP-B-51-47334 and JP-A-57-196231, esters having an aromatic skeleton described in JP-A-59-5240, JP-A-59-5241 and JP-A-2-226149, and esters containing an amino group described in JP-A-1-165613.

The above-described ester monomers can also be used as a mixture.

Specific examples of the monomer, which is an amide of an aliphatic polyvalent amine compound with an unsaturated carboxylic acid, include methylene bisacrylamide, methylene bismethacrylamide, 1,6-hexamethylene bisacrylamide, 1,6-hexamethylene bismethacrylamide, diethylenetriamine trisacrylamide, xylylene bisacrylamide and xylylene bismethacrylamide.

Other preferable examples of the amide monomer include amides having a cyclohexylene structure described in JP-B-54-21726.

Urethane type addition polymerizable compounds produced using an addition reaction between an isocyanate and a hydroxy group are also preferably used, and specific examples thereof include vinylurethane compounds having two or more polymerizable vinyl groups per molecule obtained by adding a vinyl monomer containing a hydroxy group represented by formula (V) shown below to a polyisocyanate compound having two or more isocyanate groups per molecule, described in JP-B-48-41708.

wherein R and R' each independently represents H or $CH_3$.

Also, urethane acrylates described in JP-A-51-37193, JP-B-2-32293 and JP-B-2-16765, and urethane compounds having an ethylene oxide skeleton described in JP-B-58-49860, JP-B-56-17654, JP-B-62-39417 and JP-B-62-39418 are preferably used.

Furthermore, the resin composition capable of being cured at short times can be obtained by using an addition polymerizable compound having an amino structure or a sulfide structure in its molecule described in JP-A-63-277653, JP-A-63-260909 and JP-A-1-105238.

Other examples include polyfunctional acrylates and methacrylates, for example, polyester acrylates and epoxy acrylates obtained by reacting an epoxy resin with acrylic acid or methacrylic acid described in JP-A-48-64183, JP-B-49-43191 and JP-B-52-30490. Specific unsaturated compounds described in JP-B-4643946, JP-B-140337 and JP-B-1-40336, and vinylphosphonic acid series compounds described in JP-A-2-25493 can also be exemplified. In some cases, structure containing a perfluoroalkyl group described in JP-A-61-22048 can be preferably used. Moreover, photocurable monomers or oligomers described in *Nippon Secchaku Kyokaishi* (*Journal of Japan Adhesion Society*), Vol. 20, No. 7, pages 300 to 308 (1984) can also be used.

In view of the photo-speed, a structure having a large content of unsaturated groups per molecule is preferred and in many cases, a difunctional or more functional compound is preferred. In order to increase the strength of image area, that is, hardened layer, a trifunctional or more functional compound is preferred. A combination use of compounds different in the functional number or in the kind of polymerizable group (for example, an acrylic acid ester, a methacrylic acid ester, a styrene compound or a vinyl ether compound) is an effective method for controlling both the sensitivity and the strength. The polymerizable compound is preferably used in an amount from 5 to 80% by weight, more preferably from 25 to 75% by weight, based on the total solid content of the resin composition. The polymerizable compounds may be used individually or in combination of two or more thereof.

Before and/or after the laser decomposition, the laser-decomposable resin composition containing the polymerizable compound can be polymerized and cured by energy, for example, light or heat.

<Initiator>

As the initiator, initiators known to those skilled in the art can be used without limitation. Specifically, many compounds described in literature, for example, Bruce M. Monroe et al., *Chemical Review*, 93, 435 (1993), R. S. Davidson, *Journal of Photochemistry and Biology A: Chemistry*, 73, 81 (1993), J. P. Faussier, *Photoinitiated Polymerization-Theory and Applications: Rapra Review*, Vol. 9, Report, Rapra Technology (1998) or M. Tsunooka et al., *Prog. Polym. Sci.*, 21, 1 (1996) can be used. Further, a group of compounds undergoing oxidative or reductive bond cleavage as described, for example, in F. D. Saeva, *Topics in Current Chemistry*, 156, 59 (1990), G. G. Maslak, *Topics in Current Chemistry*, 168, 1 (1993), H. B. Shuster et al., *JACS*, 112, 6329 (1990) and I. D. F. Eaton et al., *JACS*, 102, 3298 (1980) are known.

With respect to specific examples of preferable initiator, a radical initiator which is a compound that generates a radical upon light energy and/or heat energy and initiates or promotes a polymerization reaction of the above-described polymerizable compound is described in greater detail below, but the invention should not be construed as being limited thereto.

As the radical initiator preferably used in the invention, (a) an aromatic ketone, (b) an onium salt compound, (c) an organic peroxide, (d) a thio compound, (e) a hexaarylbiimidazole compound, (f) a ketoxime ester compound, (g) a borate compound, (h) an azinium compound, (i) a metallocene compound, (j) an active ester compound, (k) a compound having a carbon-halogen bond and (l) an azo series compound. Specific examples of the compounds of (a) to (l) are set forth below, but the invention should not be construed as being limited thereto.

(a) Aromatic Ketone

The aromatic ketone (a) preferably used as the radical initiator in the invention includes compounds having a benzophenone skeleton or a thioxantone skeleton described in J. P. Fouassier and J. F. Rabek, *Radiation Curing in Polymer Science and Technology*, pages 77 to 117 (1993). For example, the following compounds are recited.

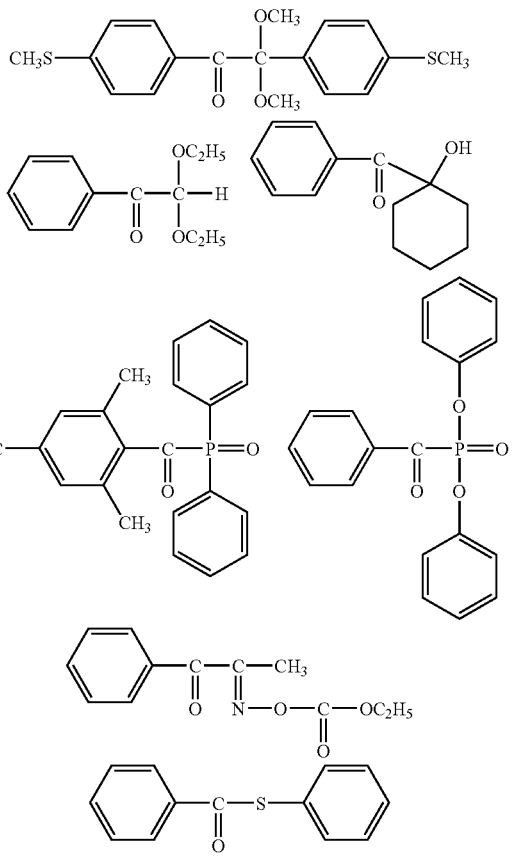

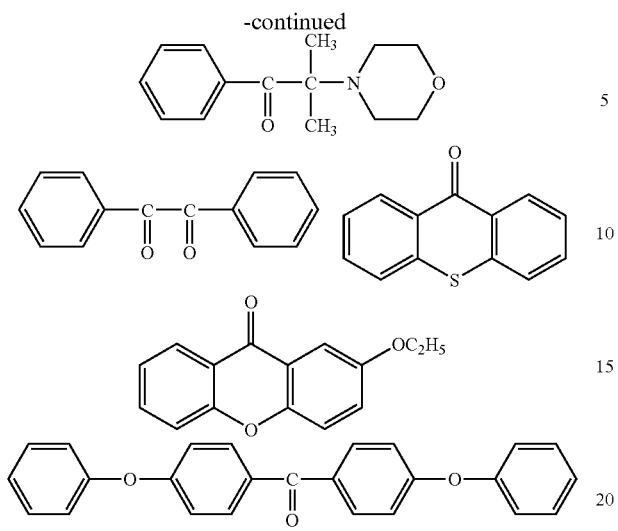

Among them, particularly preferable examples of the aromatic ketone (a) include the following compound:

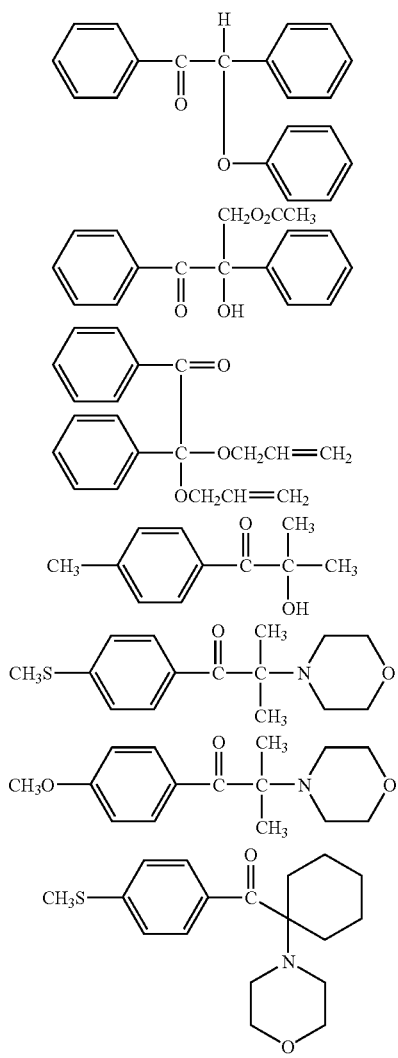

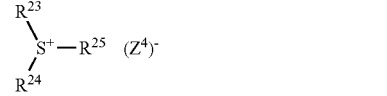

(b) Onium Salt Compound

The onium salt compound (b) preferably used as the radical initiator in the invention includes compounds represented by the following formulae (1) to (3):

$$Ar^1-I^+-Ar^2 \quad (Z^2)^- \quad (1)$$

$$Ar^3-N^+\equiv N \quad (Z^3)^- \quad (2)$$

$$\begin{array}{c} R^{23} \\ | \\ S^+-R^{25} \quad (Z^4)^- \\ | \\ R^{24} \end{array} \quad (3)$$

In formula (1), $Ar^1$ and $Ar^2$ each independently represent an aryl group having not more than 20 carbon atoms, which may have a substituent. $(Z^2)^-$ represents a counter ion selected from the group consisting of a halogen ion, a perchlorate ion, a carboxylate ion, tetrafluoroborate ion, a hexafluorophosphate ion and a sulfonate ion, and is preferably a perchlorate ion, a hexafluorophosphate ion and an arylsulfonate ion.

In formula (2), $Ar^3$ represents an aryl group having not more than 20 carbon atoms, which may have a substituent. $(Z^3)^-$ represents a counter ion having the same meaning as defined for $(Z^2)^-$.

In formula (3), $R^{23}$, $R^{24}$ and $R^{25}$, which may be the same or different, each represent a hydrocarbon group having not more than 20 carbon atoms, which may have a substituent. $(Z^4)^-$ represents a counter ion having the same meaning as defined for $(Z^2)^-$.

Specific examples of the onium salt preferably used in the invention include those described in Paragraph Nos. [0030] to [0033] of JP-A-2001-133969 and Paragraph Nos. [0015] to [0046] of JP-A-2001-343742, and specific aromatic sulfonium salt compounds described in JP-A-2002-148790, JP-A-2001-343742, JP-A-2002-6482, JP-A-2002-116593 and JP-A-2004-102031 both of which the applicant has been previously proposed.

(c) Organic Peroxide

The organic peroxide (c) preferably used as the radical initiator in the invention includes almost all organic compounds having at least one oxygen-oxygen bond in the molecules thereof. Specific examples of the organic peroxide include methyl ethyl ketone peroxide, cyclohexanone peroxide, 3,3,5-trimethylcyclohexanone peroxide, methylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis(tert-butylperoxy)butane, tert-butylhydroperoxide, cumene hydroperoxide, diisopropylbenzene hydroperoxide, paramethane hydroperoxide, 2,5-dimethylhexane-2,5-dihydroperoxide, 1,1,3,3-tetramethylbutyl hydroperoxide, di-tert-butyl peroxide, tert-butyl cumyl peroxide, dicumyl peroxide, bis(tert-butylperoxyisopropyl)benzene, 2,5-dimethyl-2,5-di(tert-butylperoxy)hexane, 2,5-xanoyl peroxide, succinic peroxide, benzoyl peroxide, 2,4-dichlorobenzoyl peroxide, methatoluoyl peroxide, diisopropylperoxy dicarbonate, di-2-ethylhexylperoxy dicarbonate, di-2-ethoxyethylperoxy dicarbonate, dimethoxyisopropylperoxy dicarbonate, di(3-methyl-3-methoxybutyl)peroxy dicarbonate, tert-butylperoxy acetate, tert-butylperoxy pivalate, tert-butylperoxy neodecanoate, tert-butylperoxy octanoate, tert-butylperoxy 3,5,5-trimethylhexanoate, tert-butylperoxy laurate, tertiary carbonate, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3',4,4'-tetra(tert-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, carbonyl di(tert-butylperoxydihydrogen diphthalate) and carbonyl di(tert-hexylperoxydihydrogen diphthalate).

Among them, peroxy ester compounds, for example, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3',4,4'-tetra(tert-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone and di-tert-butyldiperoxy isophthalate are preferred.

(d) Thio Compound

The thio compound (d) preferably used as the radical initiator in the invention includes compounds having the structure represented by the following formula (4):

Formula (4):

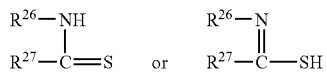

In formula (4), $R^6$ represents an alkyl group, an aryl group or a substituted aryl group. $R^{27}$ represents a hydrogen atom or an alkyl group. Alternatively, $R^{26}$ and $R^{27}$ combine with each other and together represent a non-metallic atomic group necessary for forming a 5-membered, 6-membered or 7-membered ring, which may contain a hetero atom selected from an oxygen atom, a sulfur atom and a nitrogen atom.

Specific examples of the thio compound represented by formula (4) include the following compounds:

| No. | $R^{26}$ | $R^{27}$ |
|---|---|---|
| 1 | —H | —H |
| 2 | —H | —CH$_3$ |
| 3 | —CH$_3$ | —H |
| 4 | —CH$_3$ | —CH$_3$ |
| 5 | —C$_6$H$_5$ | —C$_2$H$_5$ |
| 6 | —C$_6$H$_5$ | —C$_4$H$_9$ |
| 7 | —C$_6$H$_4$Cl | —CH$_3$ |
| 8 | —C$_6$H$_4$Cl | —C$_4$H$_9$ |
| 9 | —C$_6$H$_4$—CH$_3$ | —C$_4$H$_9$ |
| 10 | —C$_6$H$_4$—OCH$_3$ | —CH$_3$ |
| 11 | —C$_6$H$_4$—OCH$_3$ | —C$_2$H$_5$ |
| 12 | —C$_6$H$_4$—OC$_2$H$_5$ | —CH$_3$ |
| 13 | —C$_6$H$_4$—OC$_2$H$_5$ | —C$_2$H$_5$ |
| 14 | —C$_6$H$_4$—OCH$_3$ | —C$_4$H$_9$ |
| 15 | —(CH$_2$)$_2$— | |
| 16 | —(CH$_2$)$_2$—S— | |
| 17 | —CH(CH$_3$)—CH$_2$—S— | |
| 18 | —CH$_2$—CH(CH$_3$)—S— | |
| 19 | —C(CH$_3$)$_2$—CH$_2$—S— | |
| 20 | —CH$_2$—C(CH$_3$)$_2$—S— | |
| 21 | —(CH$_2$)$_2$—O— | |
| 22 | —CH(CH$_3$)—CH$_2$—O— | |
| 23 | —C(CH$_3$)$_2$—CH$_2$—O— | |
| 24 | —CH=CH—N(CH$_3$)— | |
| 25 | —(CH$_2$)$_3$—S— | |
| 26 | —(CH$_2$)$_2$—CH(CH$_3$)—S— | |
| 27 | —(CH$_2$)$_3$—O— | |
| 28 | —(CH$_2$)$_5$— | |
| 29 | —C$_6$H$_4$—O— | |
| 30 | —N=C(SCH$_3$)—S— | |
| 31 | —C$_6$H$_4$—NH— | |
| 32 | 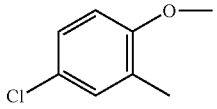 | |

(e) Hexaarylbiimidazole Compound

The hexaarylbiimidazole compound (e) preferably used as the radical initiator in the invention includes lophine dimers described in JP-B-45-37377 and JP-B-44-86516, specifically, for example, 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole and 2,2'-bis(o-trifluoromethylphenyl)-4,4',5,5'-tetraphenylbiimidazole.

(f) Ketoxime Ester Compound

The ketoxime ester compound (f) preferably used as the radical initiator in the invention includes, for example, 3-benzoyloxyiminobutan-2-one, 3-acetoxyiminobutan-2-one, 3-propyonyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one and 2-ethoxycarbonyloxyimino-1-phenylpropan-1-one.

(g) Borate Compound

The borate compound (g) preferably used as the radical initiator in the invention includes compounds represented by the following formula (5):

Formula (5):

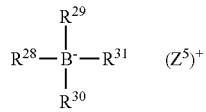

In formula (5), $R^{28}$, $R^{29}$, $R^{30}$ and $R^{31}$, which may be the same or different, each represents a substituted or unsubstituted alkyl group, a substituted or unsubstituted aryl group, a substituted or unsubstituted alkenyl group, a substituted or unsubstituted alkynyl group or a substituted or unsubstituted heterocyclic group, or at least two of $R^{28}$, $R^{29}$, $R^{30}$ and $R^{31}$ may be combined with each other to form a cyclic structure, provided that at least one of $R^{28}$, $R^{29}$, $R^{30}$ and $R^{31}$ represents a substituted or unsubstituted alkyl group. $(Z^5)^+$ represents an alkali metal cation or a quaternary ammonium cation.

Specific examples of the compound represented by formula (5) include compounds described in U.S. Pat. Nos. 3,567,453 and 4,343,891, European Patents 109,772 and 109,773, and the following compounds:

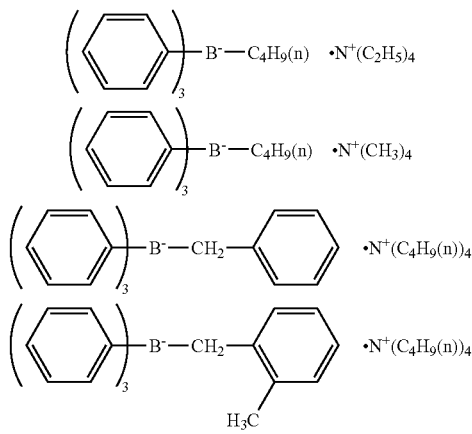

(h) Azinium Compound

The azinium compound (h) preferably used as the radical initiator in the invention includes compounds having an N—O bond described in JP-A-63-138345, JP-A-63-142345, JP-A-63-142346, JP-A-63-143537 and JP-B-4642363.

(i) Metallocene Compound

The metallocene compound (i) preferably used as the radical initiator in the invention includes titanocene compounds described in JP-A-59-152396, JP-A-61-151197, JP-A-63-41484, JP-A-2-249 and JP-A-2-4705, and iron-arene complexes described in JP-A-1-304453 and JP-A-1-152109.

Specific examples of the titanocene compound include dicyclopentadienyl-Ti-dichloride, dicyclopentadienyl-Ti-biphenyl, dicyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,3,4,6-trifluorophen-1-yl, dicyclopentadienyl-Ti-bis-2,6-difluorophen-1-yl, dicyclopentadienyl-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)bis[2,6-difluoro-3-(pyr-1-yl)phenyl]titanium, bis(cyclopentadienyl)bis[2,6-difluoro-3-(methylsulfonamido)phenyl]titanium, bis(cyclopentadienyl)bis[2,6-difluoro-3-(N-butylpivaloylamino)phenyl]titanium, bis(cyclopentadienyl)bis[2,6-difluoro-3-(N-butyl-(4-chlorobenzoyl)amino)phenyl]titanium, bis(cyclopentadienyl)bis[2,6-difluoro-3-(N-benzyl-2,2-dimethylpentanoylamino)phenyl]titanium, bis(cyclopentadienyl)bis[2,6-difluoro-3-(N-(2-ethylhexyl)-4-tolylsulfonylamino)phenyl]titanium, bis(cyclopentadienyl)bis[2,6-difluoro-3-(N-(3-oxaheptyl)benzoylamino)phenyl]titanium, bis(cyclopentadienyl)bis[2,6-difluoro-3-(N-(3,6-dioxadecyl)benzoylamino)phenyl]titanium, bis(cyclopentadienyl)bis[2,6-difluoro-3-(trifluoromethylsulfonylamino)phenyl]titanium, bis(cyclopentadienyl)bis[2,6-difluoro-3-(trifluoroacetylamino)phenyl]titanium, bis(cyclopentadienyl)bis[2,6-difluoro-3-(2-chlorobenzoylamino)phenyl]titanium, bis(cyclopentadienyl)bis[2,6-difluoro-3-(4-chlorobenzoylamino)phenyl]titanium, bis(cyclopentadienyl)bis[2,6-difluoro-3-(N-(3,6-dioxadecyl)-2,2-dimethylpentanoylamino)phenyl]titanium, bis(cyclopentadienyl)bis[2,6-difluoro-3-(N-(3,7-dimethyl-7-methoxyoctyl)benzoylamino)phenyl]titanium and bis(cyclopentadienyl)bis[2,6-difluoro-3-(N-cyclohexylbenzoylamino)phenyl]titanium.

(j) Active Ester Compound

The active ester compound (j) preferably used as the radical initiator in the invention includes imidosulfonate compounds described in JP-B-62-6223, and active sulfonates described in JP-B-63-14340 and JP-A-59-174831.

(k) Compound Having a Carbon-Halogen Bond

The compound having a carbon-halogen bond (k) preferably used as the radical initiator in the invention includes the compounds represented by the following formulae (6) to (12):

Formula (6):

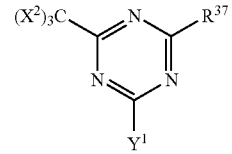

In formula (6), $X^2$ represents a halogen atom, $Y^1$ represents $-C(X^2)_3$, $-NH_2$, $-NHR^{38}$, $-N(R^{38})_2$ or $-OR^{38}$, $R^{38}$ represents an alkyl group, a substituted alkyl group, an aryl group or a substituted aryl group, and $R^{37}$ represents $-C(X^2)_3$, an alkyl group, a substituted alkyl group, an aryl group, a substituted aryl group or a substituted alkenyl group.

Formula (7):

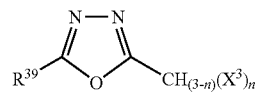

In formula (7), $R^{39}$ represents an alkyl group, a substituted alkyl group, an alkenyl group, a substituted alkenyl group, an aryl group, a substituted aryl group, a halogen atom, an alkoxy group, a substituted alkoxy group, a nitro group or a cyano group, $X^3$ represents a halogen atom, and n represents an integer of 1 to 3.

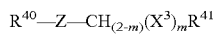 Formula (8)

In formula (8), $R^{40}$ represents an aryl group or a substituted aryl group, $R^{41}$ represents a group shown below or a halogen atom, $Z^6$ represents —C(=O)—, —C(=S)— or —SO$_2$—, $X^3$ represents a halogen atom, and m represents 1 or 2.

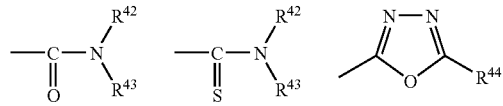

wherein $R^{42}$ and $R^{43}$ each represents an alkyl group, a substituted alkyl group, an alkenyl group, a substituted alkenyl group, an aryl group or a substituted aryl group, and $R^{44}$ has the same meaning as defined for $R^{38}$ in formula (6).

Formula (9):

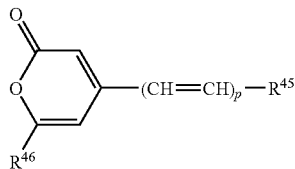

In formula (9), $R^{45}$ represents an aryl group which may be substituted or a heterocyclic group which may be substituted, $R^{46}$ represents a trihaloalkyl group or trihaloalkenyl group each having from 1 to 3 carbon atoms, and p represents 1, 2 or 3.

Formula (10):

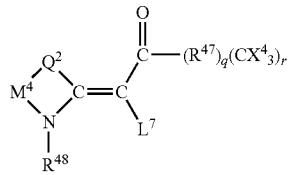

In formula (10), which represents a carbonylmethylene heterocyclic compound having a trihalogenomethyl group, $L^7$ represents a hydrogen atom or a group represented by formula —CO—$(R^{47})_q(C(X^4)_3)_r$, Q represents a sulfur atom, a selenium atom, an oxygen atom, a dialkylmethylene group, an alken-1,2-ylene group, a 1,2-phenylene group or —N(—$R^{48}$)—, $M^4$ represents a substituted or unsubstituted alkylene group, a substituted or unsubstituted alkenylene group or a 1,2-arylene group, $R^{48}$ represents an alkyl group, an aralkyl group or an alkoxyalkyl group, $R^{47}$ represents a divalent carbocyclic or heterocyclic aromatic group, $X^4$ represents a chlorine atom, a bromine atom or an iodine atom, q represents 0 or 1, and r represents 1 or 2, provided that when q represents 0, r represents 1, and when q represents 1, r represents 1 or 2.

Formula (11):

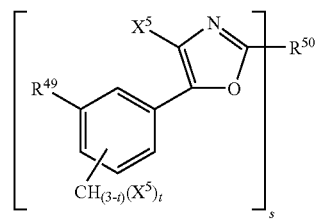

In formula (11), which represents a 4-halogeno-5-(halogenomethylphenyl)oxazole derivative, $X^5$ represents a halogen atom, t represents an integer of 1 to 3, s represents an integer of 1 to 4, $R^{49}$ represents a hydrogen atom or $CH_{3-t}X^5{}_t$, and $R^{50}$ represents an s-valent unsaturated organic residue, which may be substituted.

Formula (12):

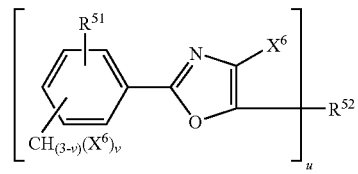

In formula (12), which represents a 2-(halogenomethylphenyl)-4-halogenooxazole derivative, $X^6$ represents a halogen atom, v represents an integer of 1 to 3, u represents an integer of 1 to 4, $R^{51}$ represents a hydrogen atom or —$CH_{3-v}X^6{}_v$, and $R^{52}$ represents an u-valent unsaturated organic residue, which may be substituted.

Specific examples of the compound having a carbon-halogen bond include compounds described in Wakabayashi et al., *Bull. Chem. Soc. Japan*, Vol. 42, 2924 (1969), for example, 2-phenyl-4,6-bis(trichloromethyl)-S-triazine, 2-(p-chlorophenyl)-4,6-bis(trichloromethyl)-S-triazine, 2-(p-tolyl)-4,6-bis(trichloromethyl)-S-triazine, 2-(p-methoxyphenyl)-4,6-bis(trichloromethyl)-S-triazine, 2-(2',4'-dichlorophenyl)-4,6-bis(trichloromethyl)-S-triazine, 2,4,6-tris(trichloromethyl)-S-triazine, 2-methyl-4,6-bis(trichloromethyl)-S-triazine, 2-n-nonyl-4,6-bis(trichloromethyl)-S-triazine and 2-(α,α,β-trichloroethyl)-4,6-bis(trichloromethyl)-S-triazine. Further, compounds described in British Patent 1,388,492, for example, 2-styryl-4,6-bis(trichloromethyl)-S-triazine, 2-(p-methylstyryl)-4,6-bis(trichloromethyl)-S-triazine, 2-(p-methoxylstyryl)-4,6-bis(trichloromethyl)-S-triazine and 2-(p-methoxylstyryl)-4-amino-6-trichloromethyl-5-triazine, compounds described in JP-A-53-133428, for example, 2-(4-methoxynaphth-1-yl)-4,6-bis(trichloromethyl)-S-triazine, 2-(4-ethoxynaphth-1-yl)-4,6-bis(trichloromethyl)-S-triazine, 2-[4-(2-ethoxyethyl)naphth-1-yl]-4,6-bis(trichloromethyl)-S-triazine, 2-(4,7-dimethoxynaphth-1-yl)-4,6-bis(trichloromethyl)-S-triazine and 2-(acenaphth-5-yl)-4,6-bis(trichloromethyl)-S-triazine, and compounds described in German Patent 3,337,024, for example, the compounds shown below are exemplified. Moreover, compounds which can be easily synthesized by one skilled in the art according to synthesis methods described in M. P. Hutt, E. F. Elslager and L. M. Herbel,

*Journal of Heterocyclic Chemistry*, Vol. 7, No. 3, page 511 et seq. (1970), for example, the compounds shown below are exemplified.

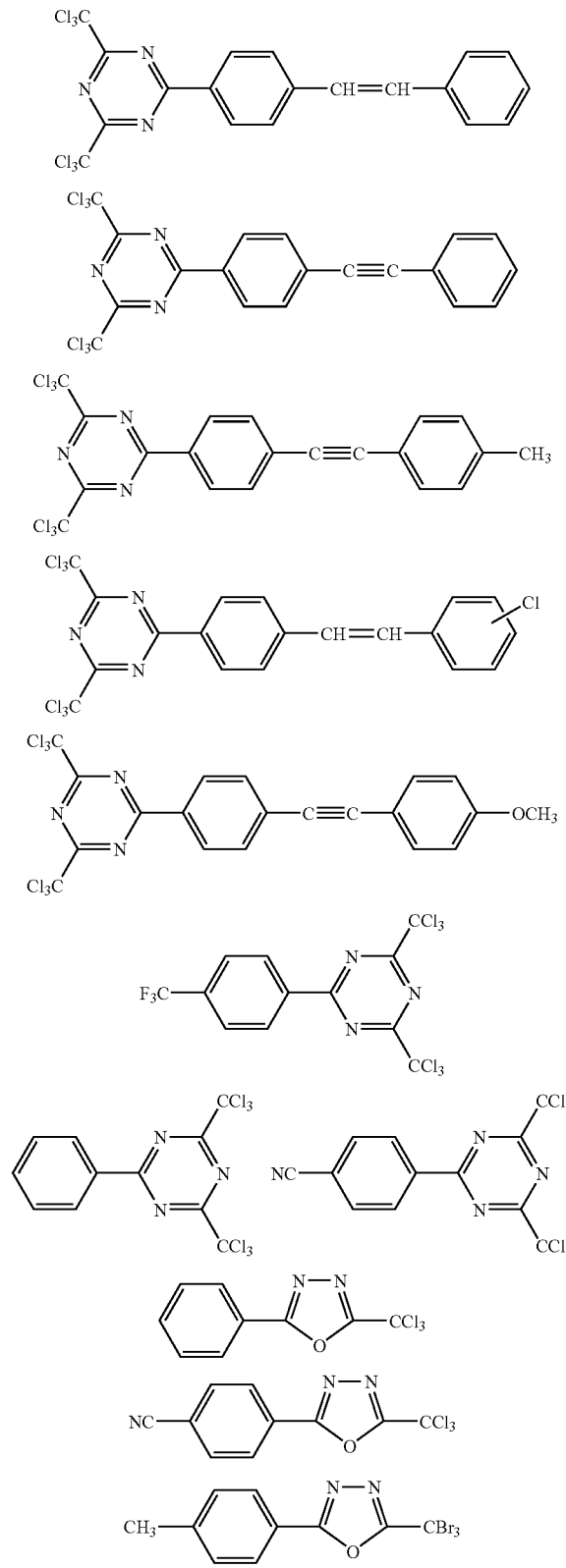

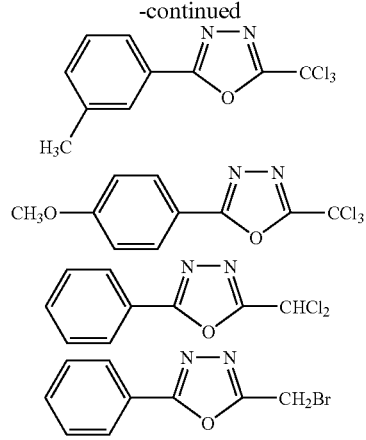

(l) Azo Series Compound

The azo series compound (l) preferably used as the radical initiator in the invention includes, for example, 2,2'-azobisisobutyronitrile, 2,2'-azobispropionitrile, 1,1'-azobis(cyclohexane-1-carbonitrile), 2,2'-azobis(2-methylbutyronitrile), 2,2'-azobis(2,4-dimethylvaleronitrile), 2,2'-azobis(4-methoxy-2,4-dimethylvaleronitrile), 4,4'-azobis(4-cyanovaleric acid), dimethyl 2,2'-azobisisobutyrate, 2,2'-azobis(2-methylpropionamidooxime), 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[N-(2-propenyl)-2-methylpropionamide] and 2,2'-azobis(2,4,4-trimethylpentane).

More preferable examples of the radical initiator for use in the invention include the above-described aromatic ketone (a), onium salt compound (b), organic peroxide (c), hexaarylbiimidazole compound (e), metallocene compound (i) and compound having a carbon-halogen bond (k), and most preferable examples of the radical initiator include the aromatic iodonium salt, aromatic sulfonium salt, titanocene compound and trihalomethyl-S-triazine compound represented by formula (6) described above.

The initiator can be added to the laser-decomposable resin composition containing the polymerizable compound ordinarily from 0.1 to 50% by weight, preferably from 0.5 to 30% by weight, particularly preferably from 5 to 20% by weight, based on the total solid content of the polymerizable composition.

The initiators can be preferably used individually or in combination of two or more thereof in the invention.

Other Components

To the laser-decomposable resin composition according to the invention, other components suitable for the use and production method thereof may further be appropriately added. Preferable examples of the additive are described below.

<Sensitizing Dye>

In the case wherein the exposure is conducted using as a light source, a laser (for example, YAG laser or semiconductor laser) emitting an infrared ray of 760 to 1,200 nm, an infrared absorbing agent is ordinarily used. The infrared absorbing agent absorbs a laser beam and generates heat to accelerate thermal decomposition. The infrared absorbing agent for use in the invention includes a dye and pigment each having an absorption maximum in a wavelength range of 760 to 1,200 nm.

As the dye, commercially available dyes and known dyes described in literatures, for example, Senryo Binran (Dye Handbook) compiled by The Society of Synthetic Organic Chemistry, Japan (1970) can be used. Specifically, the dye includes azo dyes, metal complex azo dyes, pyrazolone azo dyes, naphthoquinone dyes, anthraquinone dyes, phthalocyanine dyes, carbonium dyes, quinoneimine dyes, methine dyes, cyanine dyes, squarylium dyes, pyrylium salts and metal thiolate complexes.

Examples of preferable dye include cyanine dyes described, for example, in JP-A-58-125246, JP-A-59-84356, JP-A-59-202829 and JP-A-60-78787, methine dyes described, for example, in JP-A-58-173696, JP-A-58-181690 and JP-A-58-194595, naphthoquinone dyes described, for example, in JP-A-58-112793, JP-A-58-224793, JP-A-59-48187, JP-A-59-73996, JP-A-60-52940 and JP-A-60-63744, squarylium dyes described, for example, in JP-A-58-112792, and cyanine dyes described, for example, in British Patent 434,875.

Also, near infrared absorbing sensitizers described in U.S. Pat. No. 5,156,938 are preferably used. Further, substituted arylbenzo(thio)pyrylium salts described in U.S. Pat. No. 3,881,924, trimethinethiapyrylium salts described in JP-A-57-142645 (corresponding to U.S. Pat. No. 4,327,169), pyrylium compounds described in JP-A-58-181051, JP-A-58-220143, JP-A-59-41363, JP-A-59-84248, JP-A-59-84249, JP-A-59-146063 and JP-A-59-146061, cyanine dyes described in JP-A-59-216146, pentamethinethiopyrylium salts described in U.S. Pat. No. 4,283,475, and pyrylium compounds described in JP-B-5-13514 and JP-B-5-19702 are also preferably used. Other preferable examples of the dye include near infrared absorbing dyes represented by formulae (I) and (II) in U.S. Pat. No. 4,756,993.

Other preferable examples of the infrared absorbing dye according to the invention include specific indolenine cyanine dyes described in JP-A-2002-278057.

Of the dyes, cyanine dyes, squarylium dyes, pyrylium dyes, nickel thiolate complexes and indolenine cyanine dyes are preferred. Further, cyanine dyes and indolenine cyanine dyes are more preferred.

Specific examples of the cyanine dye preferably used in the invention include those described in Paragraph Nos. [0017] to [0019] of JP-A-2001-133969, Paragraph Nos. [0012] to [0038] of JP-A-2002-40638 and Paragraph Nos. [0012] to [0023] of JP-A-2002-23360.

The dye represented by formula (d) or formula (e) shown below is preferable from the standpoint of light-to-heat conversion property.

Formula (d):

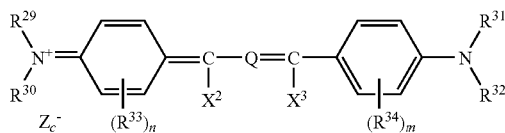

In formula (d), $R^{29}$ to $R^{32}$ each independently represents a hydrogen atom, an alkyl group or an aryl group. $R^{33}$ and $R^{34}$ each independently represents an alkyl group, a substituted oxy group or a halogen atom. n and m each independently represents an integer of 0 to 4. $R^{29}$ and $R^{30}$ or $R^{31}$ and $R^{32}$ may be combined with each other to form a ring. Also, $R^{29}$ and/or $R^{30}$ and $R^{33}$ or $R^{31}$ and/or $R^{32}$ and $R^{34}$ may be combined with each other to form a ring. Further, when plural $R^{33}$s or $R^{34}$s are present, the $R^{33}$s or $R^{34}$s may be combined with each other to form a ring. $X^2$ and $X^3$ each independently represents a hydrogen atom, an alkyl group or an aryl group, provided that at least one of $X^2$ and $X^3$ represents a hydrogen atom or an alkyl group. Q represents a trimethine group which may have a substituent or a pentamethine group which may have a substituent or may form a ring structure together with a divalent organic group. $Zc^-$ represents a counter anion. However, $Zc^-$ is not necessary when the dye represented by formula (d) has an anionic substituent in the structure thereof and neutralization of charge is not needed. Preferable examples of the counter ion for $Zc^-$ include a halogen ion, a perchlorate ion, a tetrafluoroborate ion, a hexafluorophosphate ion and a sulfonate ion, and particularly preferable examples thereof include a perchlorate ion, a hexafluorophosphate ion and an arylsulfonate ion in view of the preservation stability of a coating solution for resin composition layer.

Specific examples of the dye represented by formula (d) preferably used in the invention include those illustrated below.

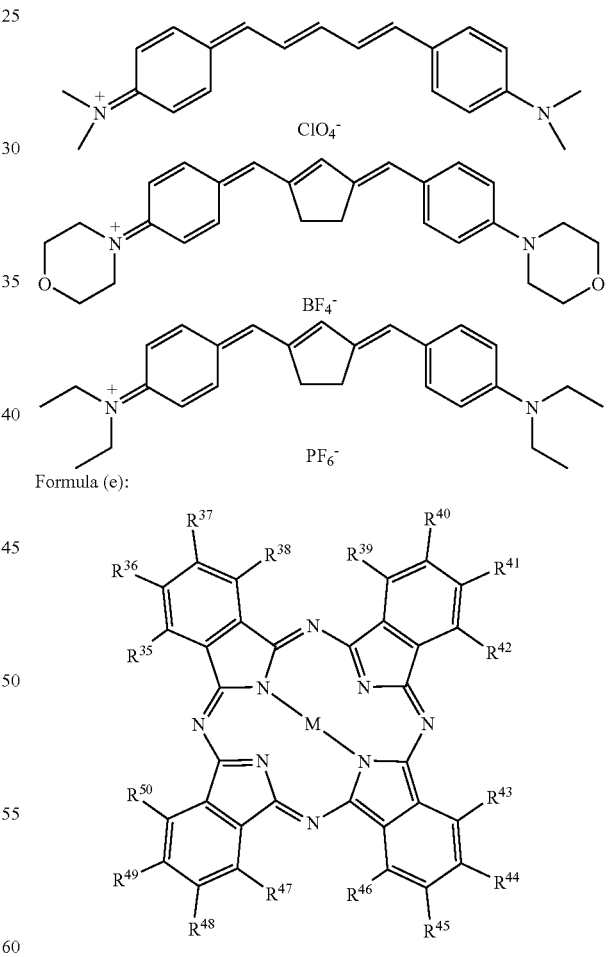

In formula (e), $R^{35}$ to $R^{50}$ each independently represents a hydrogen atom, a halogen atom, a cyano group, an alkyl group, an aryl group, an alkenyl group, an alkynyl group, a hydroxy group, a carbonyl group, a thio group, a sulfonyl group, a sulfinyl group, an oxy group, an amino group or an onium salt structure. When a substituent can be introduced into these groups, they may have the substituent. M represents two hydrogen atoms, a metal atom, a halometal group or an oxymetal group. Examples of the metal atom included therein include atoms of Groups IA, IIA, IIIB and IVB of the Periodic Table, transition metals of the first, second and third period, and lanthanoid elements. Among them, copper, magnesium, iron, zinc, cobalt, aluminum, titanium and vanadium are preferred.

Specific examples of the dye represented by formula (e) preferably used in the invention include those illustrated below.

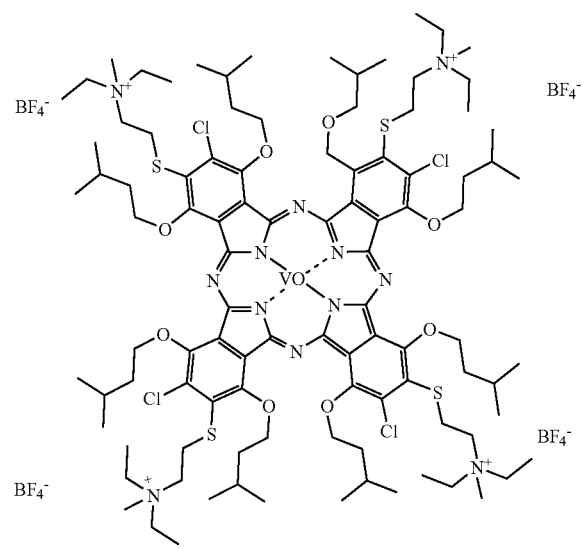

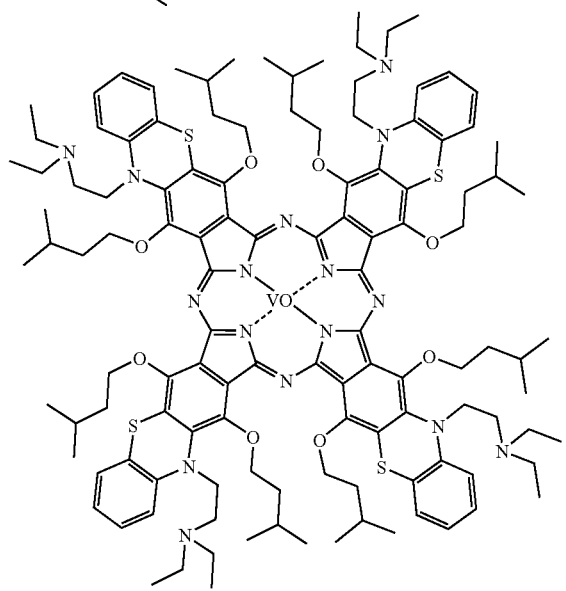

Examples of the pigment for use in the invention include commercially available pigments and pigments described in Colour Index (C.I.), Saishin Ganryo Binran (Handbook of the Newest Pigments) compiled by Pigment Technology Society of Japan (1977), Saishin Ganryo Oyou Gijutsu (Newest Application on Technologies for Pigments), CMC Publishing Co., Ltd. (1986) and Insatsu Ink Gijutsu (Printing Ink Technology), CMC Publishing Co., Ltd. (1984).

Examples of the pigment include black pigments, yellow pigments, orange pigments, brown pigments, red pigments, purple pigments, blue pigments, green pigments, fluorescent pigments, metal powder pigments and polymer-bonded dyes. Specific examples of usable pigment include insoluble azo pigments, azo lake pigments, condensed azo pigments, chelated azo pigments, phthalocyanine pigments, anthraquinone pigments, perylene and perynone pigments, thioindigo pigments, quinacridone pigments, dioxazine pigments, isoindolinone pigments, quinophthalone pigments, dying lake pigments, azine pigments, nitroso pigments, nitro pigments, natural pigments, fluorescent pigments, inorganic pigments and carbon black. Of the pigments, carbon black is preferred.

The pigment may be used without undergoing surface treatment or may be used after the surface treatment. For the surface treatment, a method of coating a resin or wax on the surface, a method of attaching a surfactant and a method of bonding a reactive substance (for example, a silane coupling agent, an epoxy compound or polyisocyanate) to the pigment surface. The surface treatment methods are described in Kinzoku Sekken no Seishitsu to Oyo (Properties and Applications of Metal Soap), Saiwai Shobo, Insatsu Ink Gijutsu (Printing Ink Technology), CMC Publishing Co., Ltd. (1984), and Saishin Ganryo Oyo Gijutsu (Newest Application on Technologies for Pigments), CMC Publishing Co., Ltd. (1986).

The pigment has a particle size of preferably from 0.01 to 10 µm, more preferably from 0.05 to 1 µm, particularly preferably from 0.1 to 1 µm. When the particle size of the pigment is 0.01 µm or more, stability of the pigment dispersion in a coating solution increases and when it is 10 µm or less, uniformity of the resin composition layer is good.

For dispersing the pigment, a known dispersion technique for use in the production of ink or toner may be used. Examples of the dispersing machine include an ultrasonic dispersing machine, a sand mill, an attritor, a pearl mill, a super-mill, a ball mill, an impeller, a disperser, a KD mill, a colloid mill, a dynatron, a three roll mill and a pressure kneader. The dispersing machines are described in detail in Saishin Ganryo Oyo Gijutsu (Newest Application on Technologies for Pigments), CMC Publishing Co., Ltd. (1986).

<Co-Sensitizer>

The sensitivity at the photo-curing of the resin composition layer can be further improved by using a certain additive (hereinafter referred to as a "co-sensitizer"). The operation mechanism of the co-sensitizer is not quite clear but may be considered to be mostly based on the following chemical process. Specifically, the co-sensitizer reacts with various intermediate active species (for example, a radical or a cation) generated during the process of photo-reaction initiated by the photopolymerization initiator and subsequent addition-polymerization reaction to produce new active radicals. The co-sensitizers are roughly classified into (a) compound which is reduced to produce an active radical, (b) compound which is oxidized to produce an active radical and (c) compound which reacts with a radical having low activity to convert it into a more highly active radical or acts as a chain transfer agent. However, in many cases, a common view about which an individual compound belongs to which type is not present.

(a) Compound which is Reduced to Produce an Active Radical

Compound Having Carbon-Halogen Bond:

An active radical is considered to be generated by the reductive cleavage of the carbon-halogen bond. Specific examples of the compound preferably used include a trihalomethyl-s-triazine and a trihalomethyloxadiazole.

Compound Having Nitrogen-Nitrogen Bond:

An active radical is considered to be generated by the reductive cleavage of the nitrogen-nitrogen bond. Specific examples of the compound preferably used include a hexaarylbiimidazole.

Compound Having Oxygen-Oxygen Bond:

An active radical is considered to be generated by the reductive cleavage of the oxygen-oxygen bond. Specific examples of the compound preferably used include an organic peroxide.

Onium Compound:

An active radical is considered to be generated by the reductive cleavage of a carbon-hetero bond or oxygen-nitrogen bond. Specific examples of the compound preferably used include a diaryliodonium salt, a triarylsulfonium salt and an N-alkoxypyridinium (azinium) salt.

Ferrocene and Iron-Arene Complexes:

An active radical can be reductively generated.

(b) Compound which is Oxidized to Produce an Active Radical

Alkylate Complex:

An active radical is considered to be generated by the oxidative cleavage of a carbon-hetero bond. Specific examples of the compound preferably used include a triaryl alkyl borate.

Alkylamine Compound:

An active radical is considered to be generated by the oxidative cleavage of a C—X bond on the carbon adjacent to nitrogen, wherein X is preferably a hydrogen atom, a carboxyl group, a trimethylsilyl group or a benzyl group. Specific examples of the compound include an ethanolamine, an N-phenylglycine and an N-trimethylsilylmethylaniline.

Sulfur-Containing or Tin-Containing Compound:

A compound in which the nitrogen atom of the above-described amine compound is replaced by a sulfur atom or a tin atom is considered to generate an active radical in the same manner. Also, a compound having an S—S bond is known to effect sensitization by the cleavage of the S—S bond.

α-Substituted Methylcarbonyl Compound:

An active radical can be generated by the oxidative cleavage of carbonyl-α-carbon bond. The compound in which the carbonyl is converted into an oxime ether also shows the similar function. Specific examples of the compound include an 2-alkyl-1-[4-(alkylthio)phenyl]-2-morpholinopronone-1 and an oxime ether obtained by a reaction of the 2-alkyl-1-[4-(alkylthio)phenyl]-2-morpholinopronone-1 with a hydroxyamine and subsequent etherification of the N—OH.

Sulfinic Acid Salt:

An active radical can be reductively generated. Specific examples of the compound include sodium arylsulfinate.

(c) Compound which Reacts with a Radical to Convert it into a More Highly Active Radical or Acts as a Chain Transfer Agent:

For example, a compound having SH, PH, SiH or GeH in its molecule is used as the compound which reacts with a radical to convert it into a more highly active radical or acts as a chain transfer agent. The compound donates hydrogen to a low active radical species to generate a radical or is oxidized and deprotonized to generate a radical. Specific examples of the compound include a 2-mercaptobenzothiazole, a 2-mercaptobenzoxazole and a 2-mercaptobenzimidazole.

A large number of examples of the co-sensitizer are more specifically described, for example, in JP-A-9-236913 as additives for the purpose of increasing sensitivity, and they can be used in the invention. Some of them are set forth below, but the invention should not be construed as being limited thereto. In the formulae below, -TMS indicates a trimethylsilyl group.

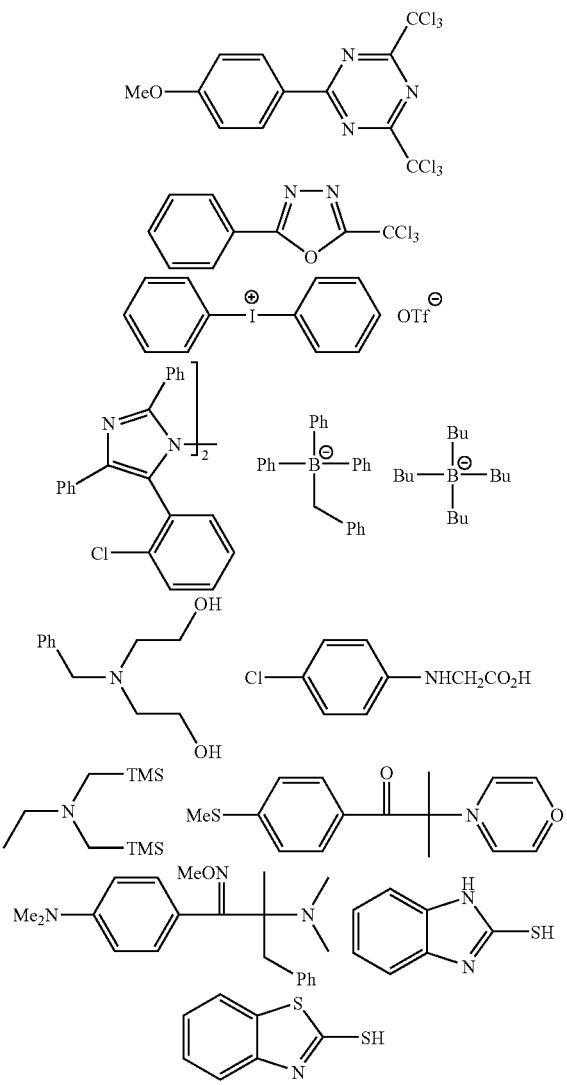

Similarly to the above-described sensitizing dye, the co-sensitizer can be subjected to various chemical modifications so as to improve the characteristics of the resin composition layer. For instance, methods, for example, binding to the sensitizing dye, initiator compound, addition-polymerizable unsaturated compound or other part, introduction of a hydrophilic site, introduction of a substituent for improving compatibility or inhibiting deposition of crystal, introduction of a substituent for improving an adhesion property, and formation of a polymer, may be used.

The co-sensitizers may be used individually or in combination of two or more thereof. The amount of the co-sensitizer used is ordinarily from 0.05 to 100 parts by weight, preferably from 1 to 80 parts by weight, more preferably from 3 to 50 parts by weight, per 100 parts by weight of the polymerizable compound having an ethylenically unsaturated double bond.

<Polymerization Inhibitor>

It is preferred to add a small amount of a thermal polymerization inhibitor to the resin composition according to the invention in addition to the above-described components, in order to prevent undesirable thermal polymerization of the polymerizable compound having an ethylenically unsaturated double bond during the production or preservation of the resin composition. Suitable examples of the thermal polymerization inhibitor include hydroquinone, p-methoxyphenol, di-tert-butyl-p-cresol, pyrogallol, tert-butylcatechol, benzoquinone, 4,4'-thiobis(3-methyl-6-tert-butylphenol), 2,2'-methylenebis(4-methyl-6-tert-butylphenol) and N-nitrosophenylhydroxyamine cerium(III) salt. The amount of the thermal polymerization inhibitor added is preferably from about 0.01 to about 5% by weight based on the total resin composition. In order to avoid polymerization inhibition due to oxygen, a higher fatty acid derivative, for example, behenic acid or behenic amide may be added and allowed to localize on the resin composition layer surface during the drying step after the coating thereof on a support, if desired. The amount of the higher fatty acid derivative added is preferably from about 0.5 to about 10% by weight based on the total resin composition.

<Coloring Agent>

A coloring agent, for example, a dye or a pigment may further be added for the purpose of coloring the resin composition layer. By the coloring, visibility of the image area or aptitude for an image density measurement apparatus can be improved. A pigment is preferably used as the coloring agent. Specific examples the coloring agent include a pigment, for example, a phthalocyanine pigment, an azo pigment, carbon black or titanium oxide, and a dye, for example, Ethyl Violet, Crystal Violet, an azo dye, an anthraquinone dye or a cyanine dye. The amount of the coloring agent added is preferably from about 0.5 to about 5% by weight based on the total resin composition.

<Other Additives>

Further, known additives, for example, a filler or a plasticizer may be added for improving physical properties of the cured layer.

The filler may be an organic compound, an inorganic compound or a mixture thereof. Examples of the organic compound include carbon black, carbon nanotube, fullerene and graphite. Examples of the inorganic compound include silica, alumina, aluminum and calcium carbonate.

Examples of the plasticizer include dioctyl phthalate, didodecyl phthalate, triethylene glycol dicaprylate, dimethyl glycol phthalate, tricresyl phosphate, dioctyl adipate, dibutyl sebacate and triacetyl glycerol. In the case of using a binder, the plasticizer can be added in an amount of 10% by weight or less based on the total weight of the compound having an ethylenically unsaturated double bond and the binder.

<Pattern-Forming Material>

The pattern-forming material of the invention comprises a support having thereon a layer comprising the laser-decomposable resin composition according to the invention. The layer (hereinafter, also referred to as a pattern-forming layer) comprising the laser-decomposable resin composition contains at least the components (A) and (B) described above. The pattern-forming layer may further contain the above-described polymerizable compound, initiator and other components, if desired.

The term "pattern-forming material" as used herein means a pattern-forming material wherein based on laser exposure, the exposed area forms a concave portion in comparison with the unexposed area, whereby a concavo-convex pattern is formed. Therefore, it includes not only a pattern-forming material of type wherein the concave portion is directly (for example, by ablation) formed by the laser exposure but also a pattern-forming material of type wherein the concave portion is formed by conducting heating treatment or development processing with an aqueous alkali solution or the like after the laser exposure. The pattern-forming material according to the invention is particularly preferably used as the pattern-forming material of the former type.

As for the pattern-forming material preferably used according to the invention, the use thereof is not particularly restricted, as long as the above-described characteristic is fulfilled, and it can be utilized over a wide range, for instance, in a printing plate precursor, for example, for lithographic printing, gravure printing, letterpress or screen printing, a printed circuit board, a photoresist material for semiconductor and a recording material for optical disc. According to the invention, the pattern-forming material is preferably used as a printing plate precursor for direct plate-making by engraving with laser, so-called "laser engraving". In particular, it is preferably used as a flexographic printing plate precursor and a flexographic printing plate precursor for laser engraving is most preferable for the pattern-forming material according to the invention.

(Support)

A material having flexibility and excellent dimensional stability is preferably used as the support of the pattern-forming material in the invention. Examples of the support include a polyethylene terephthalate film, a polyethylene naphthalate film, a polybutylene terephthalate film and a polycarbonate film. The thickness of the support is preferably from 50 to 350 μm and more preferably from 100 to 250 μm from the standpoint, for example, of mechanical characteristics, shape stability and handling property of the pattern-forming material. Also, in order to increase adhesion between the support and the pattern-forming layer, a known adhesive layer conventionally used for such a purpose may be provided on the surface of the support, if desired.

Further, the adhesion property to the pattern-forming layer or the adhesive layer can be improved by conducting physical or chemical treatment on the surface of support used in the invention. Examples of the physical treatment include a sand blast method, a wet sand blast method spraying liquid containing fine particles, a corona discharge treatment method, a plasma treatment method or an ultraviolet ray or vacuum ultraviolet ray irradiation treatment method. Examples of the chemical treatment include a strong acid treatment method, a strong alkali treatment method, an oxidant treatment method and a coupling agent treatment method.

(Formation of Film)

In order to mold the laser-decomposable resin composition according to the invention into a sheet form, a roll form or a cylindrical form, a molding method for conventional resin can be used. For example, a casting method, a method of extruding the resin composition from a nozzle or dies using a machine, for example, a pump or an extruder and adjusting the thickness by a blade or by calendering with a roller is exemplified. In such case, it is also possible to perform the molding accompanied with heating within a range wherein the performance of the resin composition is not damaged. Also, a rolling treatment, a grinding treatment or the like may be carried out, if desired. Ordinarily, the resin composition is molded on an underlay referred to as a back film composed of a material, for example, PET or nickel in many cases. Further, a cylindrical support made of fiber reinforced plastic (FRP), plastic or metal can also be used. As the cylindrical support, a hollow cylindrical support having a constant thickness can be used for the purpose of weight saving. The role of the back film or cylindrical support is to ensure the dimensional stability of pattern-forming material. Therefore, a material with high dimensional stability should be selected. Specific examples of the material include a crystalline resin, for example, a polyester resin, a polyimide resin, a polyamide resin, polyamideimide resin, a polyetherimide resin, polybismaleimide resin, a polysulfone resin, a polycarbonate resin, a polyphenyleneether resin, a polyphenylenethioether resin, a polyehtersulsone resin or a full aromatic polyester resin, a full aromatic polyamide resin and an epoxy resin. Further, the resins may be used in the form of laminate. For example, a sheet composed of a full aromatic polyamide film having a thickness of 4.5 μm both surfaces of which are laminated with a polyethylene terephthalate layer having a thickness of 50 μm is exemplified. Moreover, a porous sheet, for example, a cloth formed by knitting of fiber, a nonwoven cloth or a film having fine pores can be used as the back film. In the case of using a porous sheet as the back film, when the resin composition is impregnated into the pores of the porous sheet and subjected to light curing, a high adhesive property can be achieved by means of integration of the cured resin layer and the back film. Examples of the fiber for the formation of cloth or nonwoven cloth include, an inorganic fiber, for example, a glass fiber, an alumina fiber, a carbon fiber, an alumina-silica fiber, a boron fiber, a high silicon fiber, a potassium titanate fiber or a sapphire fiber, a natural fiber, for example, cotton or hemp, a semisynthetic fiber, for example, rayon or acetate, and a synthetic fiber, for example, nylon, polyester, acryl, vinylon, polyvinyl chloride, polyolefin, polyurethane, polyimide or aramide. Furthermore, cellulose produced by a bacterium is a high crystalline nanofiber and a material capable of forming a thin and highly dimensionally stable nonwoven fiber.

It is preferred from the standpoint of increasing the strength of layer formed that the laser-decomposable resin composition according to the invention is cured by crosslinking (polymerization) before the decomposition with laser. In order to cure the resin composition, it is preferred to incorporate the polymerizable compound as described above into the resin composition. This method is ordinarily employed as a means for increasing the strength of layer in a negative-type (polymerization type) photosensitive material, and it is believed that the similar result can also be achieved in the invention.

The method is particularly effective in the case wherein the pattern-forming material is a flexographic printing plate precursor for laser engraving. By the curing before the laser engraving, advantages are obtained, in that a relief formed by the laser engraving becomes sharp and in that tackiness of engraved scrap generated at the laser engraving can be restrained.

The method for curing the resin composition can be used without any particular limitation as long as it is possible to cause polymerization reaction of the polymerizable compound, for example, to heat the composition, to irradiate the composition with light or to incorporate a photo- or heat-polymerization initiator or the like into the composition and to perform light irradiation of heating.

Among them, as the method for curing, the heating of the composition is preferable in view of ease of operation. For the heating to cause curing (polymerization) of the composition before the laser decomposition, any heating method, for example, an oven, a thermal head, a heating roll or a laser beam can be used. When the temperature control is necessary, it can be performed by controlling the temperature of the oven, thermal head or heating roll or by controlling the intensity or spot diameter of the laser beam. The heating temperature is preferably from 40 to 250° C., more preferably from 60 to 220° C., and still more preferably from 80 to 200° C., from the standpoint of thermal stability of the coexisting organic compound. The heating time is preferably from 1 to 120 minutes, and more preferably from 5 to 60 minutes, in view of preventing the occurrence of a side reaction (for example, thermal decomposition of additive) other than the curing by heating.

The thickness of the laser-decomposable resin composition layer is ordinarily from 0.0005 to 10 mm, and preferably from 0.005 to 7 mm.

The thickness for use in the laser engraving (particularly in the flexographic printing plate precursor for laser engraving) can be appropriately determined depending on the purpose of utilization. The thickness is preferably in a range of 0.05 to 10 mm, and more preferably in a range of 0.1 to 7 mm. In some cases, the layers having different compositions may be multiply laminated.

As a combination of plural layers, for example, it is possible to from a layer capable of undergoing engraving using a laser having an emitting wavelength in a near infrared region, for example, a YAG laser, a fiber laser or a semiconductor laser as the uppermost layer and under the layer, a layer capable of undergoing laser engraving using an infrared laser, for example, a carbon dioxide gas laser or a visible-ultraviolet laser is formed. In the case of conducting the laser engraving of such laminate, different laser engraving apparatus equipped with an infrared laser and a near infrared laser respectively can be employed or one laser engraving apparatus equipped with both of an infrared laser and a near infrared laser can be employed.

According to the invention, a cushion layer composed of a resin or rubber having cushioning property can be formed between the support and the pattern-forming layer or between the pattern-forming layer and the adhesive layer. In the case of forming the cushion layer between the support and pattern-forming layer, a method of preparing the cushion layer having an adhesive layer on one side and pasting the adhesive layer side thereof onto the support is simple. After pasting the cushioning layer, the surface may be subjected to cutting and polishing to shape. In a simpler manner, a liquid adhesive composition is coated on the support in a constant thickness and cured with light to from the cushion layer. It is preferable for the cushion layer to have the cushioning property that the hardness of the cushion layer cured with light is low. The resin layer cured with light having the cushioning property may contain bubbles.

<Laser Engraving>

In the laser engraving, a relief image is formed on the pattern-forming material by making digitalized data based on the image to be formed and operating a laser equipment utilizing a computer.

As described above, the pattern-forming material for use in laser engraving is not particularly restricted, and the flexographic printing plate precursor for laser engraving is particularly preferably used.

The laser used in the laser engraving can be any laser as long as it is able to form a pattern by laser ablation of the pattern-forming material. In order to carry out the engraving with high speed, a laser having a high power is desirable. One preferable example of the laser is a laser having an emitting wavelength in an infrared region or near infrared region, for example, a carbon dioxide gas laser, a YAG laser, a semiconductor laser or a fiber laser. Also, an ultraviolet laser having an emitting wavelength in an ultraviolet region, for example, an excimer laser, a YAG laser wavelength-converted to the third harmonic or the fourth harmonic or a copper vapor laser is also able to conduct ablation processing which cleaves a bond between molecules of organic compound and thus is suitable for microfabrication. A laser having an extremely high peak power, for example, a femtosecond laser can also be employed. The laser irradiation may be performed continuously or pulsewise. As for the flexographic printing plate precursor for laser engraving, a carbon dioxide gas laser or a YAG laser is preferably used.

Although the engraving with laser is conducted under oxygen-containing gas, ordinarily in the presence of air or in airflow, it can be conducted under carbon dioxide gas or nitrogen gas. After the completion of the engraving, the powdery or liquid substance (scrap) occurred on the surface of relief image can be removed by an appropriate method, for example, a method of washing out, for example, with a solvent or water containing a surfactant, a method of spraying an aqueous cleaning agent, for example, by a high-pressure sprayer, a method of spraying high-pressure steam, or a method of wiping off with cloth or the like.

The laser-decomposable resin composition according to the invention can be applied to various usages, for example, a stamp, a seal, a design roll for embossing, a relief image for patterning an insulator, resistor or conductive paste used for the production of electronic components, a relief image for a mold material of ceramic materials, a relief image for display, for example, an advertising board or a sign board, or a prototype or matrix of various moldings, as well as the relief image.

It is also achieved to decrease tackiness on the surface of pattern image by forming a modifying layer on the surface of pattern image after the laser engraving. As the modifying layer, a coating treated with a compound reacting with the surface hydroxy group of the pattern image, for example, a silane coupling agent or a titanium coupling agent or a polymer film containing porous inorganic particles is exemplified. The silane coupling agent widely used is a compound having in its molecule a functional group having high reactivity with the surface hydroxy group of the pattern image. Examples of such a functional group include a trimethoxysilyl group, an triethoxysilyl group, a trichlorosilyl group, a diethoxysilyl group, a dimethoxysilyl group, a dichlorosilyl group, a monoethoxysilyl group, a monomethoxysilyl group and a monochlorosilyl group. At least one of the functional groups is present in the molecule of the compound and the compound is fixed on the surface of the pattern image by the reaction of the functional group with the surface hydroxy group of the pattern image. Further, as the compound constituting the silane coupling agent according to the invention, that having in its molecule at least one reactive functional group selected from an acryloyl group, a methacryloyl group, an active halogen-containing amino group, an epoxy group, a vinyl group, a perfluoroalkyl group and a mercapto group or that having in its molecule a long chain alkyl group is also used. When the coupling agent fixed on the surface has particularly a polymerizable reactive group in its molecule, the more solid coating can be formed by irradiating the surface with light, heat or an electron beam to form crosslinkage after the fixing the coupling agent on the surface.

EXAMPLES

The present invention will be described in more detail with reference to the following examples, but the invention should not be construed as being limited thereto.

Examples 1 to 15 and Comparative Examples 1 to 3

Evaluation of Thermophysical Property

Compounds (A) (compound capable of undergoing decarboxylation due to heat) used in the examples and Components c1 and c2 used in the comparative examples are set for the below.

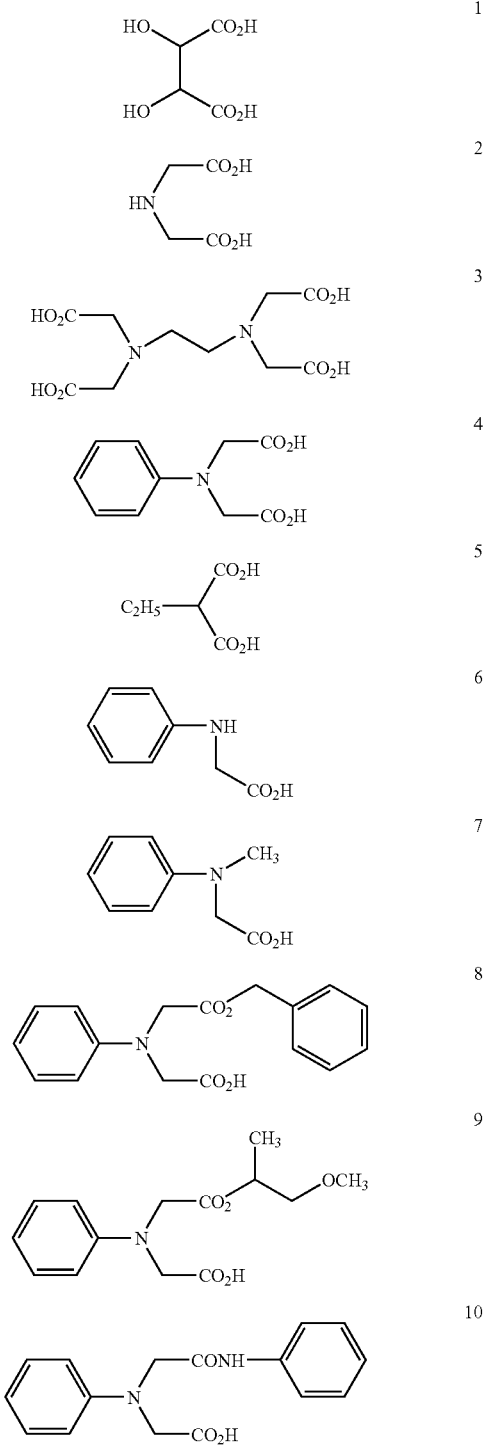

-continued

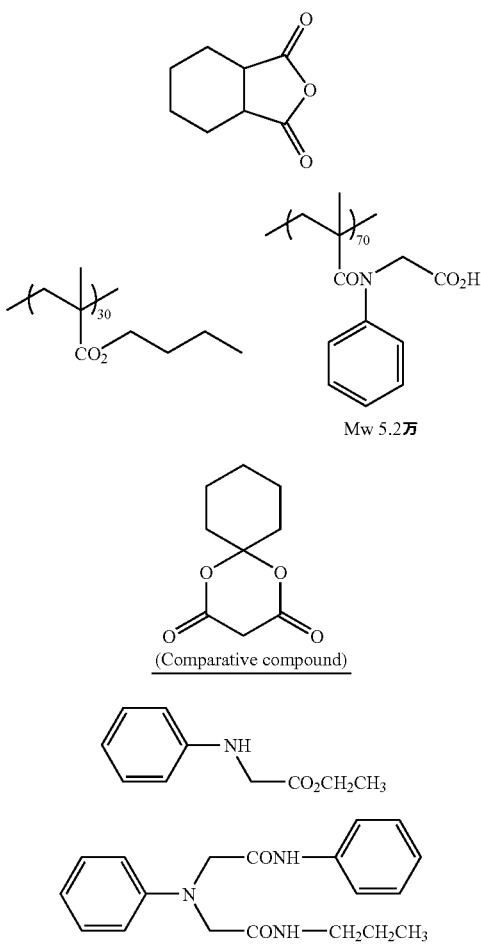

Measurement of Thermophysical Property

The binder polymer and the compound capable of undergoing decarboxylation due to heat or Component c1 or c2 as shown in Table 1 below were mixed in a kneader for laboratory at material temperature of 130° C. to prepare a composition. The amount of the compound capable of undergoing decarboxylation due to heat was adjusted to 15% by weight based on the total solid content of the composition in each of Examples 1 to 15.

In Example 15, A-BPE-4 (produced by Shin-Nakamura Chemical Co., Ltd.) was added in an amount of 35% by weight based on the total solid content of the composition as a polymerizable compound (monomer) and the resulting composition was cured using an over equipped with an exhaust system at normal pressure and at 160° C. for 20 minutes. The curing of the composition was confirmed by measurement of the disappearance of the peak derived from a carbon-carbon unsaturated bond using FT-IR.

The amount of Component c1 or c2 in Comparative Example 2 or 3 was adjusted to 15% by weight based on the total solid content of the composition.

The initiation temperature of thermal decomposition was measured under the condition described below. The term "initiation temperature of thermal decomposition" as used herein means temperature at which decrease of weight resulting from the thermal decomposition of a sample initiates while the sample has been heated.

Equipment

Thermogravimetric apparatus (produced by TA Instruments Japan Co., Ltd.)

Condition of Measurement

From the composition prepared above, 10 g was weighed for a sample. The sample was heated from 30 to 550° C. at a temperature rising rate of 20° C./minute.

The results obtained are shown in Table 1.

TABLE 1

Evaluation Results of Thermal Decomposability

| | Binder Polymer | Compound Capable of Undergoing Decarboxylation Due to Heat | Presence or Absence of Polymerizable Compound | Presence or Absence of Heating for Curing | Initiation Temperature of Thermal Decomposition of Sample (° C.) |
|---|---|---|---|---|---|
| Example 1 | Styrene-Butadiene Block Copolymer* | 1 | absence | absence | 290 |
| Example 2 | " | 2 | absence | absence | 280 |
| Example 3 | " | 3 | absence | absence | 280 |
| Example 4 | " | 4 | absence | absence | 255 |
| Example 5 | " | 5 | absence | absence | 290 |
| Example 6 | " | 6 | absence | absence | 250 |
| Example 7 | " | 7 | absence | absence | 250 |
| Example 8 | " | 8 | absence | absence | 235 |
| Example 9 | " | 9 | absence | absence | 235 |
| Example 10 | " | 10 | absence | absence | 230 |
| Example 11 | " | 11 | absence | absence | 290 |
| Example 12 | " | 12 | absence | absence | 300 |
| Example 13 | " | 13 | absence | absence | 300 |
| Example 14 | " | 10 | presence | absence | 220 |
| Example 15 | " | 10 | presence | presence | 210 |
| Comparative Example 1 | " | none | absence | absence | 400 |

TABLE 1-continued

Evaluation Results of Thermal Decomposability

| | Binder Polymer | Compound Capable of Undergoing Decarboxylation Due to Heat | Presence or Absence of Polymerizable Compound | Presence or Absence of Heating for Curing | Initiation Temperature of Thermal Decomposition of Sample (° C.) |
|---|---|---|---|---|---|
| Comparative Example 2 | " | c1 | absence | absence | 400 |
| Comparative Example 3 | " | c2 | absence | absence | 400 |

Styrene-butadiene block copolymer*: trade name: TR2000, produced by JSR Corp.

From the results shown in Table 1, it is apparent that in the examples, the initiation temperature of thermal decomposition decreases and the thermal decomposability is excellent in any sample in comparison with the comparative examples. These results indicate that the thermal decomposability of the binder polymer is increased by the action of the compound capable of undergoing decarboxylation due to heat.

Examples 16 to 22 and Comparative Examples 4 to 5

Evaluation of Laser Decomposability

TABLE 2

Composition of Relief Layer

| Component of Relief Layer | Starting Material | Amount (% by weight) |
|---|---|---|
| Polymer | Styrene-butadiene block copolymer (trade name: TR2000, produced by JSR Corp.) | 60.00 |
| Polymerizable Compound | Hexanediol dimethacrylate | 15.00 |
| Initiator | Benzyl dimethyl ketal | 1.00 |
| Laser Irradiation Absorber | Finely divided carbon black | 3.00 |
| Additive | 1,4-Benzoquinone (ozone degradation preventing wax) | 1.00 |
| Compound Capable of Undergoing Decarboxylation Due to Heat | Shown in Table 3 below | 20.00 |

At the formation of relief layer shown in Table 2 on a support, the polymer, additive, compound capable of undergoing decarboxylation due to heat, initiator and laser irradiation absorber were mixed first in a kneader for laboratory at material temperature of 100° C. After 15 minutes, the laser irradiation absorber was uniformly dispersed. The resulting mixture was then dissolved in toluene together with the polymerizable compound (monomer) at 90° C., cooled to 60° C. and cast on an uncoated PET film having a thickness of 125 μm. The film was dried in the atmosphere at room temperature for 24 hours and then dried at 60° C. for 3 hours. Thereafter, the relief layer (thickness: 1,000 μm) formed was laminated to a second PET film having a thickness of 125 μm coated with a mixture of adhesion forming components and the uncoated PET film having a thickness of 125 μm was peeled off thereby preparing a sample.

The following treatment was conduced as appropriate.

Heating for Crosslinking the Relief Layer

The relief layer prepared above was heated using an over equipped with an exhaust system at normal pressure and at 160° C. for 20 minutes to crosslink the relief layer. The crosslinking of the relief layer was confirmed by measurement of the disappearance of the peak derived from a carbon-carbon unsaturated bond using FT-IR.

The depth of the concave portion formed by the laser engraving of the relief layer was measured and used as an index of the laser decomposability. When the laser irradiation of same energy amount was conducted, as the depth of the concave portion formed by the laser engraving is large, the laser decomposability is high.

The evaluation of the depth of engraving with laser was performed by engraving using a high-grade $CO_2$ Laser Marker ML-9100 Series (produced by Keyence Corp.) at 12 W and line speed of 10 cm/sec with respect to a carbon dioxide ($CO_2$) laser or engraving using a Marker Engine 3000 (produced by Laserfront Technologies, Inc.) at 10 W and line speed of 10 cm/sec with respect to a Nd-YAG laser.

The results obtained are shown in Table 3.

TABLE 3

Evaluation Results of Depth of Engraving

| | Compound Capable of Undergoing Decarboxylation Due to Heat | Presence or Absence of Heating for Curing | Kind of Laser | Depth of Engraving (μm) |
|---|---|---|---|---|
| Example 16 | 6 | absence | $CO_2$ | 350 |
| Example 17 | 10 | absence | $CO_2$ | 410 |
| Example 18 | 11 | absence | $CO_2$ | 350 |
| Example 19 | 12 | absence | $CO_2$ | 350 |
| Example 20 | 13 | absence | $CO_2$ | 340 |
| Example 21 | 10 | absence | Nd-YAG | 130 |
| Example 22 | 10 | presence | Nd-YAG | 150 |
| Comparative Example 3 | none | absence | $CO_2$ | 220 |
| Comparative Example 4 | C1 | absence | Nd-YAG | 35 |

From the results shown in Table 3, it can be seen that each of the relief layers of Examples 16 to 22 exhibits the large engraving depth due to the effect of increasing the thermal decomposability in comparison with the relief layers of Comparative Examples 4 and 5.

This application is based on Japanese Patent application JP 2006-219561, filed Aug. 11, 2006, and Japanese Patent application JP 2007-21100, filed Jan. 31, 2007, the entire content of which is hereby incorporated by reference, the same as if fully set forth herein.

Although the invention has been described above in relation to preferred embodiments and modifications thereof, it will be understood by those skilled in the art that other variations and modifications can be effected in these preferred embodiments without departing from the scope and spirit of the invention.

What is claimed is:

1. A pattern-forming material comprising a support and a layer obtainable by curing a laser-decomposable resin composition comprising a binder polymer, a polymerizable compound and a compound (A) including at least one structure selected from a carboxyl group and a carboxylic acid anhydride structure and at least one hetero atom selected from N, S and O atoms other than the structure in its molecule; and
wherein based on laser exposure, an exposed area of the pattern-forming material forms a concave area in comparison with an unexposed area, whereby the pattern-forming material has a concave-convex pattern.

2. The pattern-forming material according to claim 1, wherein the structure selected from a carboxyl group and a carboxylic acid anhydride structure is connected to the hetero atom through a methylene group which may be substituted.

3. The pattern-forming material according to claim 1, wherein the compound (A) includes at least one group represented by the following formula (I):

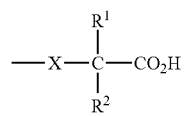
(I)

wherein X represents a divalent connecting group selected from —O—, —S—, —SO$_2$—, —NH—, —N(R$^3$)— and —CO—, R$^3$ represents a hydrogen atom or a monovalent substituent, R$^1$ and R$^2$ each independently represents a hydrogen atom or a monovalent substituent, or R$^1$ and R$^2$, or R$^3$ and either of R$^1$ and R$^2$, may be combined with each other to form a ring structure.

4. The pattern-forming material according to claim 1, wherein the compound (A) is represented by the following formula (I-2):

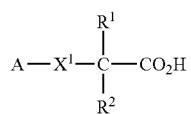
(I-2)

wherein A represents an aromatic group or a heterocyclic group, X$^1$ represents a divalent connecting group selected from —O—, —S—, —SO$_2$—, —NH—, —N(R$^3$)— and —CO—, R$^3$ represents a hydrogen atom or a monovalent substituent, R$^1$ and R$^2$ each independently represents a hydrogen atom or a monovalent substituent, or R$^1$ and R$^2$, any two of R$^1$ and R$^2$ and X$^1$, any two of R$^1$ and R$^2$ and A or A and X$^1$ may be combined with each other to form a ring structure.

5. A pattern-forming material according to claim 1, wherein the compound (A) is a compound of formula (PC-1) or formula (PC-2):

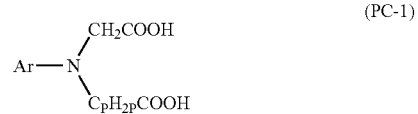
(PC-1)

wherein Ar represents a mono-, poly- or unsubstituted aryl group, and p represents an integer of from 1 to 5;

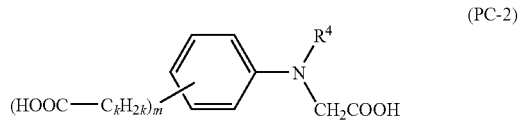
(PC-2)

wherein R$^4$ represents a hydrogen atom or an alkyl group having from 1 to 6 carbon atoms, and k and m each represents an integer of from 1 to 5.

6. The pattern-forming material according to claim 1, which is a flexographic printing plate precursor suitable for laser engraving.

7. The pattern-forming material according to claim 1, wherein the layer obtained by curing has a thickness of 0.1 to 7 mm.

* * * * *